US011368300B2

(12) United States Patent
Roth et al.

(10) Patent No.: US 11,368,300 B2
(45) Date of Patent: *Jun. 21, 2022

(54) SUPPORTING A FIXED TRANSACTION RATE WITH A VARIABLY-BACKED LOGICAL CRYPTOGRAPHIC KEY

(71) Applicant: Amazon Technologies, Inc., Seattle, WA (US)

(72) Inventors: Gregory Branchek Roth, Seattle, WA (US); Matthew John Campagna, Bainbridge Island, WA (US); Benjamin Elias Seidenberg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,085

(22) Filed: Mar. 6, 2020

(65) Prior Publication Data

US 2020/0213108 A1 Jul. 2, 2020

Related U.S. Application Data

(63) Continuation of application No. 15/947,690, filed on Apr. 6, 2018, now Pat. No. 10,587,405, which is a
(Continued)

(51) Int. Cl.
*H04L 9/08* (2006.01)
*H04L 29/06* (2006.01)
(Continued)

(52) U.S. Cl.
CPC ............ *H04L 9/0891* (2013.01); *H04L 9/088* (2013.01); *H04L 9/14* (2013.01); *H04L 63/065* (2013.01)

(58) Field of Classification Search
CPC ......... H04L 9/0891; H04L 9/088; H04L 9/14; H04L 63/065
See application file for complete search history.

(56) References Cited

U.S. PATENT DOCUMENTS

| 4,868,877 A | 9/1989 | Fischer |
| 4,918,728 A | 4/1990 | Matyas et al. |

(Continued)

FOREIGN PATENT DOCUMENTS

| CN | 1740944 | 3/2006 |
| CN | 101281578 | 10/2008 |

(Continued)

OTHER PUBLICATIONS

U.S. Appl. No. 13/916,915, filed Jun. 13, 2013.
(Continued)

*Primary Examiner* — Yonas A Bayou
(74) *Attorney, Agent, or Firm* — Davis Wright Tremaine LLP

(57) ABSTRACT

A request to perform a cryptographic operation is received, the request including a first identifier assigned to a key group, the key group comprising a plurality of second identifiers, with the plurality of second identifiers corresponding to a plurality of cryptographic keys. A second identifier is determined, according to a distribution scheme, from the plurality of second identifiers, and the cryptographic operation is performed using a cryptographic key of the plurality of cryptographic keys that corresponds to the second identifier that was determined.

20 Claims, 12 Drawing Sheets

Related U.S. Application Data continuation of application No. 15/250,738, filed on Aug. 29, 2016, now Pat. No. 9,942,036, which is a continuation of application No. 14/318,375, filed on Jun. 27, 2014, now Pat. No. 9,438,421.

(51) Int. Cl.
*H04L 9/14* (2006.01)
*H04L 9/40* (2022.01)

(56) References Cited

U.S. PATENT DOCUMENTS

| | | | |
|---|---|---|---|
| 5,054,067 A | 10/1991 | Moroney et al. | |
| 5,146,498 A | 9/1992 | Smith | |
| 5,201,000 A | 4/1993 | Matyas et al. | |
| 5,495,533 A | 2/1996 | Linehan et al. | |
| 5,633,931 A | 5/1997 | Wright | |
| 5,675,653 A | 10/1997 | Nelson | |
| 5,826,245 A | 10/1998 | Sandberg-Diment | |
| 5,862,220 A | 1/1999 | Perlman | |
| 5,870,477 A | 2/1999 | Sasaki et al. | |
| 5,933,503 A | 8/1999 | Schell et al. | |
| 6,012,144 A | 1/2000 | Pickett | |
| 6,175,625 B1 | 1/2001 | Safford et al. | |
| 6,185,679 B1 | 2/2001 | Coppersmith et al. | |
| 6,199,162 B1 | 3/2001 | Luyster | |
| 6,240,187 B1 | 5/2001 | Lewis | |
| 6,259,789 B1 | 7/2001 | Paone | |
| 6,336,186 B1 | 1/2002 | Dyksterhouse et al. | |
| 6,356,941 B1 | 3/2002 | Cohen | |
| 6,505,299 B1 | 1/2003 | Zeng et al. | |
| 6,546,492 B1 | 4/2003 | Walker et al. | |
| 6,816,595 B1 | 11/2004 | Kudo | |
| 7,295,671 B2 | 11/2007 | Snell | |
| 7,362,868 B2 | 4/2008 | Madoukh et al. | |
| 7,400,733 B1 | 7/2008 | Cam-Winget et al. | |
| 7,490,248 B1 | 2/2009 | Valfridsson et al. | |
| 7,565,419 B1 | 7/2009 | Kwiatkowski et al. | |
| 7,620,680 B1 | 11/2009 | Lamport | |
| 7,774,826 B1 | 8/2010 | Romanek et al. | |
| 7,865,446 B2 | 1/2011 | Armingaud et al. | |
| 7,877,607 B2 | 1/2011 | Circenis et al. | |
| 7,894,604 B2 | 2/2011 | Nishioka et al. | |
| 7,894,626 B2 | 2/2011 | Wang et al. | |
| 7,953,978 B2 | 5/2011 | Greco et al. | |
| 7,978,856 B2* | 7/2011 | Cho | H04L 63/065 |
| | | | 380/278 |
| 8,024,562 B2 | 9/2011 | Gentry et al. | |
| 8,024,582 B2 | 9/2011 | Kunitz et al. | |
| 8,050,405 B2* | 11/2011 | Camp, Jr. | H04W 12/03 |
| | | | 708/250 |
| 8,065,720 B1 | 11/2011 | Ebrahimi et al. | |
| 8,091,125 B1 | 1/2012 | Hughes et al. | |
| 8,111,828 B2 | 2/2012 | Raman et al. | |
| 8,140,847 B1 | 3/2012 | Wu | |
| 8,213,602 B2 | 7/2012 | Mamidwar | |
| 8,218,768 B2* | 7/2012 | Rezaiifar | H04L 63/0457 |
| | | | 380/278 |
| 8,245,037 B1 | 8/2012 | Durgin et al. | |
| 8,245,039 B2 | 8/2012 | Jones | |
| 8,251,283 B1 | 8/2012 | Norton | |
| 8,261,320 B1 | 9/2012 | Serenyi et al. | |
| 8,295,492 B2 | 10/2012 | Suarez et al. | |
| 8,302,170 B2 | 10/2012 | Kramer et al. | |
| 8,312,064 B1 | 11/2012 | Gauvin | |
| 8,315,387 B2 | 11/2012 | Kanter et al. | |
| 8,340,299 B2* | 12/2012 | Buer | H04L 9/0822 |
| | | | 380/278 |
| 8,370,648 B1 | 2/2013 | Natanzon | |
| 8,379,857 B1 | 2/2013 | Zheng | |
| 8,494,168 B1* | 7/2013 | Tolfmans | G06F 21/602 |
| | | | 380/47 |
| 8,572,369 B2 | 10/2013 | Schmidt-Karaca et al. | |
| 8,588,426 B2 | 11/2013 | Xin et al. | |
| 8,607,358 B1 | 12/2013 | Shankar et al. | |
| 8,654,970 B2 | 2/2014 | Olson et al. | |
| 8,713,311 B1 | 4/2014 | Roskind | |
| 8,751,807 B2 | 6/2014 | Ma et al. | |
| 8,774,403 B2 | 7/2014 | MacMillan et al. | |
| 8,804,950 B1 | 8/2014 | Panwar | |
| 8,868,914 B2 | 10/2014 | Teppler | |
| 8,904,181 B1 | 12/2014 | Felsher et al. | |
| 8,908,868 B1* | 12/2014 | Baer | H04L 9/083 |
| | | | 713/168 |
| 8,964,990 B1 | 2/2015 | Baer et al. | |
| 8,989,379 B2 | 3/2015 | Katar et al. | |
| 9,031,240 B2 | 5/2015 | Yang et al. | |
| 9,306,741 B1 | 4/2016 | Brainard | |
| 9,367,697 B1 | 6/2016 | Roth et al. | |
| 9,705,674 B2 | 7/2017 | Roth et al. | |
| 2001/0052071 A1 | 12/2001 | Kudo et al. | |
| 2002/0029337 A1 | 3/2002 | Sudia et al. | |
| 2002/0076044 A1 | 6/2002 | Pires | |
| 2002/0141590 A1 | 10/2002 | Montgomery | |
| 2003/0021417 A1* | 1/2003 | Vasic | H04L 9/3263 |
| | | | 713/155 |
| 2003/0037237 A1 | 2/2003 | Abgrall et al. | |
| 2003/0081790 A1 | 5/2003 | Kallahalla et al. | |
| 2003/0084290 A1 | 5/2003 | Murty et al. | |
| 2003/0093694 A1 | 5/2003 | Medvinsky et al. | |
| 2003/0110376 A1 | 6/2003 | Wiener et al. | |
| 2003/0131238 A1 | 7/2003 | Vincent | |
| 2003/0163701 A1 | 8/2003 | Ochi et al. | |
| 2003/0172269 A1 | 9/2003 | Newcombe | |
| 2003/0188181 A1 | 10/2003 | Kunitz et al. | |
| 2003/0188188 A1 | 10/2003 | Padmanabhan et al. | |
| 2003/0219129 A1 | 11/2003 | Whelan et al. | |
| 2004/0009815 A1 | 1/2004 | Zotto et al. | |
| 2004/0093499 A1 | 5/2004 | Arditi et al. | |
| 2004/0107345 A1 | 6/2004 | Brandt et al. | |
| 2004/0143733 A1 | 7/2004 | Ophir et al. | |
| 2004/0193915 A1 | 9/2004 | Smith et al. | |
| 2004/0223608 A1 | 11/2004 | Oommen et al. | |
| 2005/0010760 A1 | 1/2005 | Goh et al. | |
| 2005/0018842 A1 | 1/2005 | Fu et al. | |
| 2005/0050317 A1 | 3/2005 | Kramer et al. | |
| 2005/0120232 A1 | 6/2005 | Hori et al. | |
| 2005/0123142 A1 | 6/2005 | Freeman et al. | |
| 2005/0165859 A1 | 7/2005 | Geyer et al. | |
| 2005/0246778 A1 | 11/2005 | Usov et al. | |
| 2005/0273629 A1 | 12/2005 | Abrams et al. | |
| 2006/0010323 A1 | 1/2006 | Martin et al. | |
| 2006/0018468 A1 | 1/2006 | Toba et al. | |
| 2006/0021018 A1 | 1/2006 | Hinton et al. | |
| 2006/0143685 A1 | 6/2006 | Vasishth et al. | |
| 2006/0204003 A1 | 9/2006 | Takata et al. | |
| 2006/0206932 A1 | 9/2006 | Chong | |
| 2006/0288232 A1 | 12/2006 | Ho et al. | |
| 2006/0291664 A1 | 12/2006 | Suarez et al. | |
| 2007/0033637 A1 | 2/2007 | Yami et al. | |
| 2007/0050641 A1 | 3/2007 | Flynn et al. | |
| 2007/0136599 A1 | 6/2007 | Suga | |
| 2007/0140480 A1 | 6/2007 | Yao | |
| 2007/0180153 A1 | 8/2007 | Cornwell et al. | |
| 2007/0220279 A1 | 9/2007 | Northcutt et al. | |
| 2007/0230704 A1 | 10/2007 | Youn et al. | |
| 2007/0230706 A1 | 10/2007 | Youn | |
| 2007/0283446 A1 | 12/2007 | Yami et al. | |
| 2008/0005024 A1 | 1/2008 | Kirkwood | |
| 2008/0016337 A1 | 1/2008 | Morgan et al. | |
| 2008/0019516 A1 | 1/2008 | Fransdonk | |
| 2008/0019527 A1 | 1/2008 | Youn et al. | |
| 2008/0025514 A1 | 1/2008 | Coombs | |
| 2008/0046984 A1 | 2/2008 | Bohmer et al. | |
| 2008/0056498 A1* | 3/2008 | Verma | H04W 12/033 |
| | | | 380/278 |
| 2008/0082827 A1 | 4/2008 | Agrawal et al. | |
| 2008/0084996 A1 | 4/2008 | Chen et al. | |
| 2008/0112561 A1 | 5/2008 | Kim | |
| 2008/0127279 A1 | 5/2008 | Futa et al. | |
| 2008/0172562 A1 | 7/2008 | Cachin et al. | |
| 2008/0183656 A1 | 7/2008 | Perng et al. | |

(56) References Cited

U.S. PATENT DOCUMENTS

| | | |
|---|---|---|
| 2008/0199011 A1* | 8/2008 | Tuyls .................. G06K 19/0723 380/278 |
| 2008/0247540 A1 | 10/2008 | Ahn et al. |
| 2008/0298590 A1 | 12/2008 | Katar et al. |
| 2008/0319909 A1 | 12/2008 | Perkins et al. |
| 2009/0016532 A1* | 1/2009 | Baldischweiler .... G06Q 20/341 713/193 |
| 2009/0025087 A1 | 1/2009 | Peirson, Jr. et al. |
| 2009/0034733 A1 | 2/2009 | Raman et al. |
| 2009/0060197 A1 | 3/2009 | Taylor et al. |
| 2009/0092252 A1 | 4/2009 | Noll et al. |
| 2009/0106552 A1 | 4/2009 | Mohamed |
| 2009/0158033 A1 | 6/2009 | Jeong et al. |
| 2009/0165076 A1 | 6/2009 | DeCusatis et al. |
| 2009/0196418 A1 | 8/2009 | Tkacik et al. |
| 2009/0245519 A1 | 10/2009 | Cachin et al. |
| 2009/0276514 A1 | 11/2009 | Subramanian |
| 2009/0300356 A1 | 12/2009 | Crandell |
| 2009/0327139 A1* | 12/2009 | Shah .................... G06Q 10/087 705/71 |
| 2010/0008499 A1 | 1/2010 | Lee et al. |
| 2010/0011448 A1 | 1/2010 | Wagner |
| 2010/0014662 A1 | 1/2010 | Jutila |
| 2010/0017626 A1 | 1/2010 | Sato et al. |
| 2010/0074445 A1 | 3/2010 | Nefedov et al. |
| 2010/0095118 A1 | 4/2010 | Meka |
| 2010/0138218 A1 | 6/2010 | Geiger |
| 2010/0153670 A1 | 6/2010 | Dodgson et al. |
| 2010/0135850 A1 | 7/2010 | Liu |
| 2010/0174919 A1 | 7/2010 | Ito et al. |
| 2010/0185863 A1 | 7/2010 | Rabin et al. |
| 2010/0211781 A1 | 8/2010 | Auradkar et al. |
| 2010/0241848 A1 | 9/2010 | Smith et al. |
| 2010/0250965 A1 | 9/2010 | Olson et al. |
| 2010/0266132 A1 | 10/2010 | Bablani et al. |
| 2010/0289627 A1 | 11/2010 | McAllister et al. |
| 2010/0303241 A1 | 12/2010 | Breyel |
| 2010/0316219 A1 | 12/2010 | Boubion et al. |
| 2010/0325732 A1 | 12/2010 | Mittal et al. |
| 2011/0022642 A1 | 1/2011 | deMilo et al. |
| 2011/0055558 A1 | 3/2011 | Liu et al. |
| 2011/0072264 A1 | 3/2011 | McNulty |
| 2011/0083163 A1 | 4/2011 | Auvenshine et al. |
| 2011/0087893 A1 | 4/2011 | Williams |
| 2011/0099362 A1 | 4/2011 | Haga et al. |
| 2011/0116636 A1 | 5/2011 | Steed |
| 2011/0145571 A1 | 6/2011 | Schmidt-Karaca et al. |
| 2011/0154031 A1 | 6/2011 | Banerjee et al. |
| 2011/0154057 A1 | 6/2011 | England et al. |
| 2011/0173435 A1 | 7/2011 | Liu et al. |
| 2011/0178933 A1 | 7/2011 | Bailey |
| 2011/0191462 A1 | 8/2011 | Smith |
| 2011/0213971 A1 | 9/2011 | Gurel et al. |
| 2011/0246765 A1 | 10/2011 | Schibuk |
| 2011/0258437 A1 | 10/2011 | McKelvey et al. |
| 2011/0258443 A1 | 10/2011 | Barry |
| 2011/0296497 A1 | 12/2011 | Becker |
| 2012/0079289 A1 | 3/2012 | Weng et al. |
| 2012/0096272 A1 | 4/2012 | Jasper et al. |
| 2012/0114118 A1 | 5/2012 | Verma |
| 2012/0124612 A1 | 5/2012 | Adimatyam et al. |
| 2012/0131354 A1 | 5/2012 | French |
| 2012/0134495 A1 | 5/2012 | Liu |
| 2012/0140923 A1 | 6/2012 | Lee et al. |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0243685 A1 | 9/2012 | Tanaka et al. |
| 2012/0260094 A1 | 10/2012 | Asim et al. |
| 2012/0266218 A1 | 10/2012 | Mattsson |
| 2012/0281839 A1 | 11/2012 | Arnold et al. |
| 2012/0290850 A1 | 11/2012 | Brandt et al. |
| 2012/0291101 A1 | 11/2012 | Ahlstrom et al. |
| 2012/0297183 A1 | 11/2012 | Mukkara et al. |
| 2012/0297200 A1 | 11/2012 | Thom et al. |
| 2012/0300936 A1 | 11/2012 | Green |
| 2012/0303961 A1 | 11/2012 | Kean et al. |
| 2012/0311675 A1 | 12/2012 | Ham et al. |
| 2012/0314854 A1 | 12/2012 | Waters |
| 2012/0321078 A1 | 12/2012 | Chambers et al. |
| 2012/0321086 A1 | 12/2012 | D'Zouza et al. |
| 2012/0323717 A1 | 12/2012 | Kirsch |
| 2012/0323990 A1 | 12/2012 | Hayworth |
| 2012/0331293 A1 | 12/2012 | Ma et al. |
| 2013/0013931 A1 | 1/2013 | O'Hare et al. |
| 2013/0031255 A1 | 1/2013 | Maloy et al. |
| 2013/0044878 A1 | 2/2013 | Rich et al. |
| 2013/0111217 A1 | 5/2013 | Kopasz et al. |
| 2013/0156183 A1 | 6/2013 | Xu et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0198521 A1 | 8/2013 | Wu |
| 2013/0283045 A1 | 10/2013 | Li et al. |
| 2013/0316682 A1 | 11/2013 | Vieira |
| 2013/0326233 A1 | 12/2013 | Tolfmans |
| 2013/0346747 A1 | 12/2013 | Ignatchenko et al. |
| 2014/0003608 A1* | 1/2014 | MacMillan ........... H04L 9/3239 380/279 |
| 2014/0012751 A1 | 1/2014 | Kuhn et al. |
| 2014/0047549 A1 | 2/2014 | Bostley, III et al. |
| 2014/0115327 A1 | 4/2014 | Gorbach et al. |
| 2014/0122866 A1 | 5/2014 | Haeger et al. |
| 2014/0164774 A1 | 6/2014 | Nord et al. |
| 2014/0177829 A1 | 6/2014 | MacMillan et al. |
| 2014/0201533 A1 | 7/2014 | Kruglick |
| 2015/0110273 A1* | 4/2015 | Ponceleon ........... H04L 9/0816 380/277 |
| 2015/0222604 A1 | 8/2015 | Ylonen |
| 2018/0045189 A1 | 2/2018 | Lee et al. |

FOREIGN PATENT DOCUMENTS

| | | |
|---|---|---|
| CN | 101573910 | 11/2009 |
| CN | 101741547 | 6/2010 |
| CN | 101753302 | 6/2010 |
| CN | 102130768 | 7/2011 |
| CN | 102318263 | 1/2012 |
| CN | 102656591 | 9/2012 |
| JP | 2000215240 | 4/2000 |
| JP | 2002140534 | 5/2002 |
| JP | 2000295209 | 10/2000 |
| JP | 2001209582 | 3/2001 |
| JP | 2003188871 | 7/2003 |
| JP | 2005057417 | 3/2005 |
| JP | 2005197912 | 7/2005 |
| JP | 2005258801 | 9/2005 |
| JP | 2005533438 | 11/2005 |
| JP | 2006099548 | 4/2006 |
| JP | 2006279848 | 10/2006 |
| JP | 2006319543 | 11/2006 |
| JP | 2007037197 | 2/2007 |
| JP | 2007081482 | 3/2007 |
| JP | 2007507760 | 3/2007 |
| JP | 2007293468 | 11/2007 |
| JP | 2008015669 | 1/2008 |
| JP | 2008134789 | 6/2008 |
| JP | 2008541273 | 11/2008 |
| JP | 2008306418 | 12/2008 |
| JP | 2009213064 | 9/2009 |
| JP | 2009246800 | 10/2009 |
| JP | 2010124071 | 6/2010 |
| JP | 2010128824 | 6/2010 |
| JP | 2011019129 | 1/2011 |
| JP | 2011159053 | 8/2011 |
| JP | 2012073374 | 4/2012 |
| JP | 2012178010 | 9/2012 |
| JP | 2014501955 | 1/2014 |
| KR | 101145766 | 5/2012 |
| WO | WO0154099 | 7/2001 |
| WO | WO2004008676 | 1/2004 |
| WO | WO2009060283 | 5/2009 |
| WO | WO2010001150 | 1/2010 |
| WO | WO2010093559 | 8/2010 |

(56) References Cited

FOREIGN PATENT DOCUMENTS

| WO | WO2011083343 | 7/2011 |
|---|---|---|
| WO | WO2011089712 | 7/2011 |
| WO | WO2012060979 | 5/2012 |
| WO | WO2013145517 | 3/2013 |

OTHER PUBLICATIONS

U.S. Appl. No. 13/916,964, filed Jun. 13, 2013.
U.S. Appl. No. 13/916,999, filed Jun. 13, 2013.
Australian Examination Report No. 1 for Patent Application No. 2017204853 dated Jun. 29, 2018, 4 pages.
Australian Examination Report No. 2, dated Mar. 5, 2019, for Patent Application No. 2017204853, 3 pages.
Australian Notice of Acceptance for Patent Application No. 2017204853 dated May 16, 2019, 3 pages.
Barker et al., "Recommendation for Random Number Generation Using Deterministic Random Bit Generators," National Institute Standards and Technology Special Publication 800-90A, Jan. 2012, 136 pages.
Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.
Bethencourt et al., "Ciphertext-Policy Attribute-Based Encryption," IEEE Symposium on Security and Privacy 2007, 15 pages.
Brazil Preliminary Office Action for Patent Application No. BR1120150193781 dated Mar. 3, 2020, 7 pages.
Canadian Notice of Allowance for Patent Application No. 2,899,014 dated Feb. 8, 2018, 1 page.
Canadian Notice of Allowance, dated Jun. 25, 2019, for Patent Application No. 2,898,995, 1 page.
Canadian Office Action for Patent Application No. 2,898,995 dated Jul. 3, 2018, 9 pages.
Canadian Office Action for Patent Application No. 2,899,008 dated Feb. 19, 2020, 2 pages.
Canadian Office Action for Patent Application No. 2,899,008 dated Mar. 1, 2019, 4 pages.
Canadian Office Action for Patent Application No. 2,899,008 dated Mar. 14, 2018, 4 pages.
Canadian Office Action for Patent Application No. 2,899,019 dated Feb. 17, 2020, 5 pages.
Canadian Office Action for Patent Application No. 2,899,019 dated Jul. 3, 2018, 8 pages.
Canadian Office Action for Patent Application No. 2,899,019 dated Mar. 25, 2019, 8 pages.
Canadian Office Action for Patent Application No. 2,899,027 dated Jul. 17, 2018, 6 pages.
Canadian Office Action for Patent Application No. 2,899,027 dated May 13, 2019, 6 pages.
Chinese Decision on Rejection for Patent Application No. 201480011965.9 dated Jan. 15, 2018, 6 pages.
Chinese Decision on Rejection for Patent Application No. 201480013039.5 dated Apr. 12, 2019, 15 pages.
Chinese First Office Action for Patent Application No. 201480020482.5, dated Dec. 28, 2017, 11 pages.
Chinese Fourth Office Action for Patent Application No. 201480011965.9 dated May 20, 2019, 5 pages.
Chinese Notice of Grant for Patent Application No. 201480013039.5 dated Jun. 4, 2020, 4 pages.
Chinese Notice on Grant for Patent Application No. 201480011965.9 dated Aug. 22, 2019, 4 pages.
Chinese Notice on Grant of Patent for Application No. 201480020500.X dated Dec. 28, 2017, 4 pages.
Chinese Notice on the Second Office Action for Patent Application No. 201480020517.5 dated Jan. 3, 2018, 8 pages.
Chinese Notice to Grant for Patent Application No. 201480020482.5 dated Oct. 10, 2019, 4 pages.
Chinese Second Office Action for Patent Application No. 201480020482.5 dated Jul. 19, 2018, 28 pages.
Chinese Second Office Action, dated Sep. 25, 2018, for Patent Application No. 201480013039.5, 11 pages.
Chinese Third Office Action dated Mar. 15, 2019 for Patent Application No. 201480020482.5, 19 pages.
Chinese Third Office Action for Patent Application No. 201480013039.5 dated Dec. 13, 2019, 7 pages.
Chinese Third Office Action for Patent Application No. 201480020517.5 dated Jul. 25, 2018, 6 pages.
European Communication pursuant to Article 94(3) EPC for Application No. 14751237.0 dated May 28, 2018, 4 pages.
European Communication pursuant to Article 94(3) EPC for Application No. 14751612.4 dated Jan. 3, 2018, 4 pages.
European Communication pursuant to Article 94(3) EPC for Application No. 14751881.5 dated Jul. 2, 2019, 4 pages.
European Communication Rule 69 for Patent Application No. 19187650.7 dated Nov. 7, 2019, 7 pages.
European Communication Under Rule 71(3) EPC for Application No. 14752191.8, Intention to Grant, dated Mar. 22, 2019, 75 pages.
European Official Communication Pursuant to Article 94(3) EPC for Patent Application No. 14751256.0 dated Jan. 3, 2018, 5 pages.
European Official Letter for Patent Application No. 14751881.5 dated Feb. 21, 2018, 3 pages.
European Rule 71(3) Communication Patent Application No. 14751881.5 dated Feb. 21, 2020, 109 pages.
Guttman et al., "An Introduction to Computer Security: The NIST Handbook," Special Publication 800-12, Oct. 1, 1995, Sections 17.6 and 18.3.2 and Section 19 for cryptographic tools, XP055298016, retrieved on Aug. 26, 2016, from http://www.davidsalomon.name/CompSec/auxiliary/handbook.pdf.
IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.
India First Examination Report for Patent Application No. 7420/DELNP/2015 dated Oct. 21, 2019, 6 pages.
India First Examination Report for Patent Application No. 7421/DELNP/2015 dated Dec. 27, 2019, 7 pages.
India First Examination Report for Patent Application No. 7426/DELNP/2015 dated Dec. 26, 2019, 8 pages.
India First Examination Report for Patent Application No. 7428/DELNP/2015 dated Jan. 29, 2020, 8 pages.
India First Examination Report for Patent Application No. 7474/DELNP/2015 dated Dec. 26, 2019, 7 pages.
International Search Report and Written Opinion dated Apr. 29, 2014, in International Patent Application No. PCT/US2014/015404, filed Feb. 7, 2014.
International Search Report and Written Opinion dated May 28, 2014, in International Patent Application No. PCT/US2014/15697, filed Feb. 11, 2014.
International Search Report and Written Opinion dated May 30, 2014, in International Patent Application No. PCT/US2014/015408, filed Feb. 7, 2014.
International Search Report and Written Opinion dated May 30, 2014, in International Patent Application No. PCT/US2014/015410, filed Feb. 7, 2014.
International Search Report and Written Opinion dated May 30, 2014, International Patent Application No. PCT/US2014/015414, filed Feb. 7, 2014.
Japanese Appeal Decision for Patent Application No. 2015-558070 dated Feb. 18, 2020, 3 pages.
Japanese Appeal Decision for Patent Application No. 2016-511994 dated Mar. 12, 2019, 3 pages.
Japanese Decision on Final Rejection for Patent Application No. 2017-232031 dated Mar. 3, 2020, 4 pages.
Japanese Final Decision of Rejection for Patent Application No. 2015-558056 dated Mar. 13, 2018, 18 pages.
Japanese Final Decision on Rejection for Patent Application No. 2015-558070 dated Apr. 3, 2018, 7 pages.
Japanese Notice and Report for Revocation of Reconsideration Report for Patent Application No. 2015-558043 dated Mar. 9, 2018, 6 pages.
Japanese Notice of Allowance for Patent Application No. 2015-558042, dated Dec. 27, 2017, 6 pages.

(56) References Cited

OTHER PUBLICATIONS

Japanese Notice of Allowance for Patent Application No. 2017-217362 dated Sep. 17, 2019, 6 pages.
Japanese Notice of Allowance for Patent Application No. 2018-133603, dated May 21, 2019, 6 pages.
Japanese Notice of Allowance, dated Oct. 2, 2018, for Patent Application No. 2015-558056, 6 pages.
Japanese Notice of Final Rejection for Patent Application No. 2015-558070 dated Sep. 3, 2019, 8 pages.
Japanese Notice of Final Rejection for Patent Application No. 2017-232031 dated Mar. 26, 2019, 13 pages.
Japanese Notice of Rejection for Patent Application No. 2017-217362 dated Feb. 12, 2019, 9 pages.
Japanese Notice of Rejection, dated Sep. 4, 2018, for Patent Application No. 2015-558043, 25 pages.
Japanese Notice of Revocation for Reconsideration and Report, dated Dec. 4, 2018, for Patent Application No. 2015-558070, 4 pages.
Japanese Report on Notice of Allowance for Patent Application No. 2015-558044 dated Mar. 27, 2018, 6 pages.
Korean Decision of Grant for Patent Application No. 10-2017-7022249 dated Sep. 6, 2019, 3 pages.
Korean Notice of Preliminary Amendment, dated Apr. 4, 2019, for Patent Application No. 10-2017-7022249, 8 pages.
Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.
Manulis, et al., "Group Signatures: Authentication with Privacy," retrieved from https://www.bsi.bund.de/SharedDocs/Downloads/EN/BSI/Publications/Studies/GruPA/GruPA.pdf?_blob=publicationFile, Published May 15, 2010, 267 pages.
Nist, "Implementation Guidance for FIPS PUB 140-1 and the Cryptographic Module Validation Program," Jan. 10, 2002, 63 pages.
Nist, "Implementation Guidance for FIPS PUB 140-2 and the Cryptographic Module Validation Program," Initial Release Mar. 28, 2003, 205 pages.
Olexiy et al., "Starting Share Files with NFS," Linux Journal, dated Jan. 1, 2002, retrieved on Jan. 2, 2018, from http://www.linuxjournal.com/article/4880?page=0,0, 13 pages.
Rahumed et al., "A Secure Cloud Backup System with Assured Deletion and Version Control," 2011 International Conference on Parallel Processing Workshops, IEEE Computer Society, 8 pages.
Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.
Sieloff, "The new systems administrator: The role of becoming root," Inside Solaris, Oct. 2002, 8(10):6-9.
Stack Exchange, "Storing secrets in software," by ninefingers, Stack Exchange Security Blog, dated Sep. 6, 2011, retrieved on Jan. 2, 2018, from http://security.blogoverflow.com/2011/09/storing-secrets-in-software/, 3 pages.
Wikipedia, "IEEE P1363" an Institute of Electrical and Electronics Engineers (IEEE) standardization project for public-key cryptography, retrieved Sep. 22, 2015, from https://en.wikipedia.org/wiki/IEEE_P1363, 3 pages.
Wikipedia, "Key derivation function," retrieved Sep. 22, 2015, from https://en.wikipedia.org/wiki/Key_derivation_function, 4 pages.
Canadian Notice of Allowance for Patent Application No. 2,899,008 dated Dec. 21, 2020, 1 page.
Canadian Notice of Allowance for Patent Application No. 2,899,027 dated May 11, 2020, 1 page.
Canadian Office Action for Patent Application No. 2,898,995 dated Jul. 31, 2020, 3 pages.
Canadian Office Action for Patent Application No. 2,899,008 dated Oct. 19, 2021, 3 pages.
Canadian Office Action for Patent Application No. 2,899,019 dated Feb. 3, 2021, 3 pages.
European Communication 94(3) for Patent Application No. 19187650.7 dated Aug. 6, 2021, 7 pages.
European Communication 94(3) for Patent Application No. 19203674.7 dated Sep. 2, 2021, 4 pages.
European Communication pursuant to Article 94(3) EPC for Patent Application No. 14751881.5 dated Oct. 25, 2018, 5 pages.
India First Examination Report for Patent Application No. 7428/DELNP/2015 dated Nov. 17, 2021, 7 pages.
Japanese Notice for Revocation of Reconsideration for Patent Application No. 2017-232031 dated Sep. 29, 2020, 2 pages.
Japanese Notice of Rejection for Patent Application No. 2017-232031 dated Apr. 27, 2021, 23 pages.
Japanese Notice of Rejection for Patent Application No. 2019-190480 dated Jan. 26, 2021, 7 pages.
Japanese Office Action for Patent Application No. 2020-114298 dated Sep. 28, 2021, 11 pages.
Japanese Official Notice of Rejection for Patent Application No. 2017-232031 dated Dec. 21, 2021, 4 pages.
Japanese Revocation of Reconsideration for Patent Application No. 2017-232031 dated Sep. 29, 2020, 5 pages.

* cited by examiner

SUPPORTING A FIXED TRANSACTION RATE WITH A VARIABLY-BACKED LOGICAL CRYPTOGRAPHIC KEY

CROSS REFERENCE TO RELATED APPLICATIONS

This application is a continuation of U.S. patent application Ser. No. 15/947,690, filed Apr. 6, 2018, now U.S. Pat. No. 10,587,405, entitled "SUPPORTING A FIXED TRANSACTION RATE WITH A VARIABLY-BACKED LOGICAL CRYPTOGRAPHIC KEY," which is a continuation of U.S. patent application Ser. No. 15/250,738, filed Aug. 29, 2016, now U.S. Pat. No. 9,942,036, entitled "SUPPORTING A FIXED TRANSACTION RATE WITH A VARIABLY-BACKED LOGICAL CRYPTOGRAPHIC KEY," which is a continuation of U.S. patent application Ser. No. 14/318,375, filed Jun. 27, 2014, now U.S. Pat. No. 9,438,421, entitled "SUPPORTING A FIXED TRANSACTION RATE WITH A VARIABLY-BACKED LOGICAL CRYPTOGRAPHIC KEY," the disclosures of which are hereby incorporated herein in their entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Encryption, for example, is used extensively for the purpose of preventing unauthorized access to data. Generally, a cryptographic key is used to reversibly transform data to a state where information is both computationally and humanly unascertainable without access to the cryptographic key or without extraordinary measures (e.g., a cryptographic attack). While encryption is generally effective, without proper care being taken, the benefits of encryption can be degraded. In some examples, proper care to maintain data security requires rotation of cryptographic keys so that a single cryptographic key is not used so many times that an analysis of ciphertexts generated under the cryptographic key provides significant information usable to determine the cryptographic key. However, in many systems, tracking how many encryption operations have been performed can be challenging. For example, a distributed computer system may have multiple nodes that each performs operations with a cryptographic key. In such a system, tracking how many encryption operations each node has performed so that the aggregate number of encryption operations under the same key remains at an acceptable level can be complex, especially when the rate of performance of the encryption operations can vary widely among the nodes.

One way of preventing too many encryption operations from being performed under the same cryptographic key in a distributed system is to rotate the cryptographic key before any node in the distributed system has the opportunity to cause a limit on the number of encryption operations to be exceeded. Techniques that utilize this approach can result in underutilization of the cryptographic key since key rotation will typically occur before the limit is exhausted.

BRIEF DESCRIPTION OF THE DRAWINGS

Various embodiments in accordance with the present disclosure will be described with reference to the drawings, in which.

DETAILED DESCRIPTION

Figure 1:
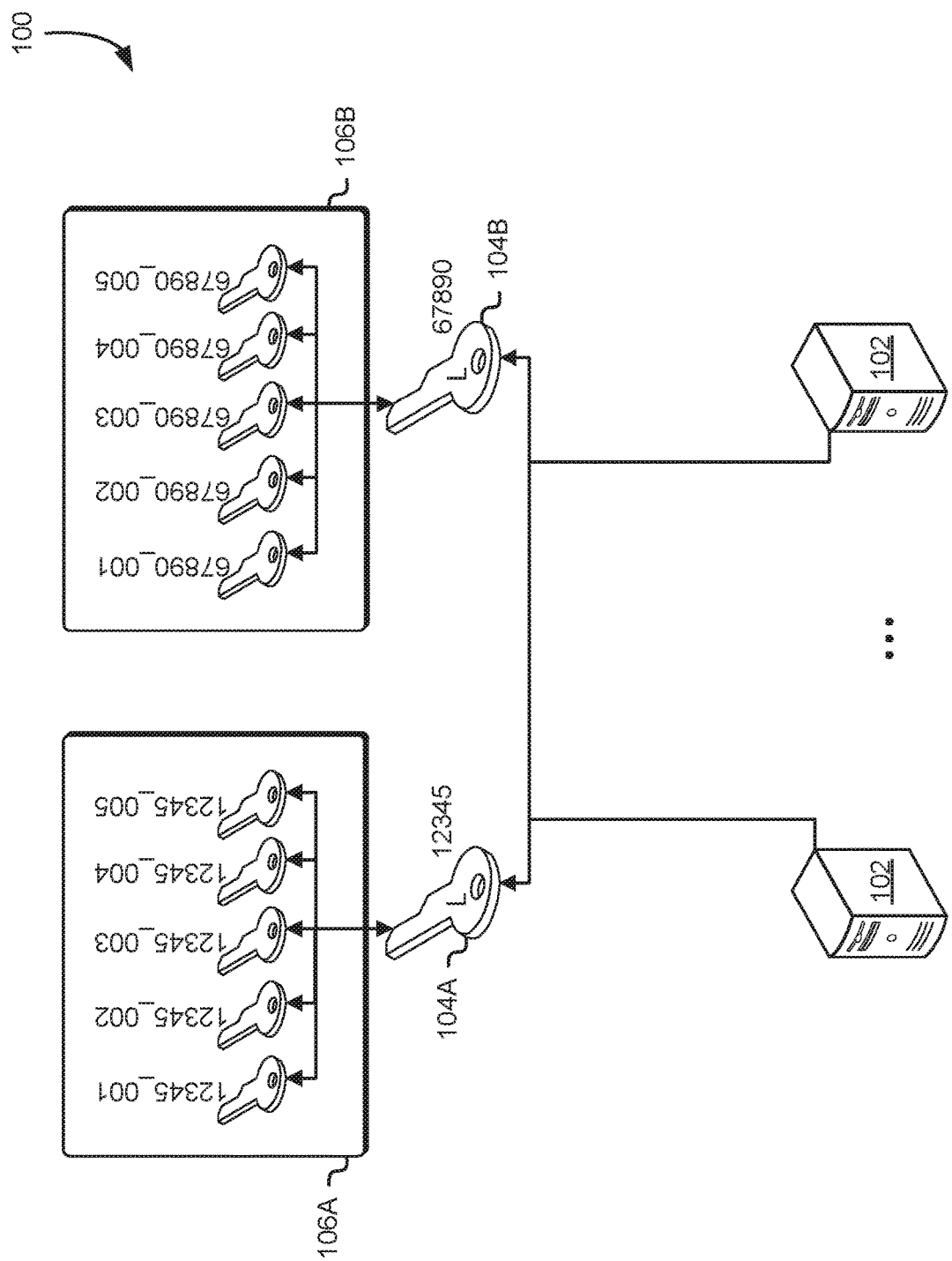
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include using a logical (i.e., virtual key or key identifier) representing multiple cryptographic keys in order to slot the rate of exhaustion of the individual cryptographic keys. For example, if requests to perform cryptographic operations using a logical key exceed a desired frequency, rather than throttling the requests, the multiple cryptographic keys may be used to fulfill the requests. In this manner, the requested rate of cryptographic operations may be maintained without compromising data security. In an embodiment, a distributed system comprises multiple nodes (e.g., physical and/or virtual computing devices) that each may have access to one or more logical cryptographic keys. Each logical cryptographic key may have one or more physical (i.e., actual) cryptographic keys backing the logical cryptographic key. To prevent various types of cryptographic attacks, limits on the usage of the physical cryptographic keys for encryption operations are enforced (e.g., the cryptographic keys may be periodically rotated) so that access to ciphertexts generated by particular cryptographic keys does not significantly affect security should a particular cryptographic key become compromised. Techniques described and suggested further include using a logical key backed by multiple physical keys that are distributed among nodes of computer systems or resources for fault tolerance. That is, by sharing logical keys among nodes and distributing the physical keys backing the logical keys to various fault zones, the loss of a physical key may only affect a limited number of nodes.

In a distributed system, different nodes may utilize a particular cryptographic key (also referred to simply as a key) at different usage rates, and the usage rates and/or differences in the usage rates of a key may not always be predictable. Consequently, the aggregate usage of a key for performance of cryptographic operations is difficult to calculate accurately in real time, with the calculation difficulty increasing depending on the number of nodes in the distributed system. To address this, a throttle may be placed on a particular key. A throttle is a limitation on the rate of performing cryptographic operations for a particular key. The throttle may be used to allow more accurate calculations of the aggregate usage of the key.

If the rate of usage of a particular key exceeds the throttle, a delay may be introduced before performing the next cryptographic operation in order to bring the usage rate to a rate at or below the throttle. In some cases, however, the demand for cryptographic operations for a particular key is such that a throttle on that key may significantly impact performance. In such a case, additional cryptographic keys may be associated with a key identifier of the particular key such that, when a node designates the key identifier (a.k.a., a logical key) for performing a cryptographic operation, one of the physical keys backing the key identifier may actually perform the cryptographic operation. In this manner, the aggregation of the throttles of each physical key represents the throttle of the logical key, and the throttle of the logical key may be increased by increasing the number of physical keys backing the logical key or by increasing the throttles on the physical keys backing the logical key. Thus, no delay need be introduced until all physical keys of the logical key have exceeded their throttle, and a node should not expect a cryptographic operation to be delayed at least until the usage rate exceeds the aggregate throttles of the physical keys backing the logical key. In some embodiments, the physical keys may be managed and contained within one or more security modules, such as described below, which may be hardware security modules.

However, in some embodiments, the logical key may have its own separate throttle, rather than being limited solely by the aggregation of the throttles of its physical keys. In such an embodiment, the logical key throttle may serve to limit the rate of cryptographic operations performed by the logical key even though the aggregation of the physical keys of the logical key may support a higher rate of transactions. However, in other embodiments, the throttle of the logical key acts as a quota for a minimum transaction rate to be supported by the logical key, and physical keys may be added to achieve the quota transaction rate. Also, in such embodiments, an increase or decrease of the logical key throttle may not necessarily affect the number of physical keys backing the logical key if the aggregation of the physical key throttles exceeds the rate allowed by the logical key throttle. Note that the throttles of the physical keys backing the logical key need not necessarily be equal; for example, the throttle of one physical key backing a logical key may be 1,000 transactions per second, whereas another physical key backing the same logical key may be throttled at 500 transactions per second.

In some embodiments, however, a change to the throttle of a logical key need not necessarily affect the number of physical keys backing the logical key, but instead may simply change the throttle values of the individual physical keys such that the aggregation of the physical key throttles meets the changed logical key throttle. In such an embodiment, the change may be distributed relatively equally among all of the physical keys backing the logical key, whereas in other cases the change in throttles may be in proportion to the proximity to exhaustion of a particular physical key; e.g., the throttles of physical keys closer to exhaustion may be adjusted lower than throttles of physical keys farther from exhaustion such that the physical keys may be exhausted at a nearly the same time should such a feature be desired in the particular embodiment. The particular key determined to perform the actual cryptographic operation for the logical key may be determined according to a variety of methods, including, but not limited to, a random or other stochastic selection scheme, round-robin selection scheme, weighted round-robin selection scheme, an attribute of the request (e.g., selecting a key based on a hash value returned after applying a hash function to the request), a type of operation to be performed (e.g., an encryption operation versus a decryption operation), whichever physical key may be present within cache, or a selection scheme based on the usage amount or rate of particular physical keys. A physical key that has reached its throttle may be skipped for a physical key that has not yet reached its throttle. For example, the round-robin selection may be weighted according to how near each particular key is to exhaustion. In some embodiments, the system that accesses and provides ciphertexts does so in accordance with executable code executed by the system where the executable code is configured to cause the system to comply with a throttle on logical and physical keys.

Generally, for the sake of efficiency, it is desirable to use the same key multiple times. However, for security purposes, it may also be desirable for the key to expire after a certain number of uses. Nonetheless, the logical key may not need to be rotated as often as a physical key or at all, because if the calculated usage of a physical key exceeds a limit, the physical key may be rotated instead of the logical key. Rotation of a cryptographic key involves deprovisioning the cryptographic key and replacing the cryptographic key with another cryptographic key. Because the physical keys of the logical key are performing the actual cryptologic operation and because the physical keys may be rotated when their usage exceeds a limit, access to ciphertexts generated by a physical key does not significantly affect security should the logical key of the physical key become compromised.

Deprovisioning a cryptographic key, in some embodiments, may involve disabling the physical key from being used for certain subsets of cryptographic operations, such as encryption operations, while still allowing the physical key to perform certain other subsets of cryptographic operations, such as decryption operations. In this manner, ciphertext encrypted with a particular physical key may still be decrypted even after the physical key has been deprovisioned and rotated. In some cases, deprovisioning the physical key may prevent its use for all cryptographic operations, and in some of these cases, deprovisioning the physical key may include removing the physical key from association with the logical key and, in some examples, deleting (e.g., by overwriting) the physical key from memory to render the physical key unrecoverable. In some embodiments, deprovisioning a physical key renders the physical key unusable for one type of cryptographic operation (e.g., encryption) but still usable for another type of cryptographic operation (e.g., decryption) so that, for instance, the physical key is usable to decrypt ciphertexts produced under the physical key, but unusable to produce additional ciphertexts. When the physical key is deprovisioned, it may be replaced with a replacement key which may be used for cryptographic operations, such as encryption, decryption, and digital signatures.

In some embodiments a customer of a computing resource service provider may not share a particular logical key with another entity. In other embodiments, a logical key may be associated with a particular host machine. In some embodiments, an entity (e.g., an instance, a resource, a service, an application, or a user) may be assigned one or more logical keys that are not shared with any other such entity. In some embodiments, a physical key may be associated with a particular hardware security module, and a logical key then may be backed by the physical keys of a plurality hardware security modules.

Another aspect of the present disclosure is the use of a logical key with variable backing physical keys to provide fault tolerance and fault isolation for cryptographic operations. In one embodiment, a multitude of physical keys may be generated for a logical key such that, if one or more physical keys of the logical key is lost or compromised, the amount of data affected by the lost or compromised keys may be minimized. Alternately, the number of physical keys backing a logical key may be related to a usage level of the physical key; that is, rather than a throttle related to number of operations in a certain time period, there may be a limit set on the number of volumes in a distributed computing environment using a particular physical key during a certain period of time. For example, a limit may be set on physical keys such that they may not be used with more than 100 volumes, meaning that the loss of the key will affect only 100 volumes at most. In this example, then, for a logical key to be used for 1,000 volumes, the logical key may be backed by 10 physical keys. In some cases a customer of a computing resource service provider may specify a usage limit for a physical key of a logical being used. In other embodiments, a logical key may be shared between different fault zones, and physical keys may be allocated depending on the fault zone of the request for a cryptographic operation originates.

In some embodiments, the logical key may initially only be backed by a single physical key, and additional physical keys may be added to back the logical key as needed. For example, an entity may be initially using a key identifier for a single physical key perform cryptographic operations. The key may be utilized by the entity by referencing an ID of the physical key, possibly my making a call to an application programming interface and passing the ID of the physical key. It may be that the throttle or usage limit assigned to the physical key is desired to be increased; at this point the additional physical keys may be generated and associated with the ID of the original physical key such that the key identifier serves as a logical key backed by multiple physical keys. In this case, an aggregation of the throttles or usage limits of the physical keys meet the throttle or usage limit needed for the key associated with the key identifier. To the entity making the request for a cryptographic operation, the key identifier may remain the same and the cryptographic operations may be performed without interruption or apparent change. In some embodiments, there may be hierarchical levels of logical and physical keys. For example, a logical key may be backed by one or more other logical keys in addition to or as an alternative to one or more physical keys, and each of those one or more logical keys may in turn be backed by one or more additional logical keys in addition to or as an alternative to one or more physical keys.

FIG. 1 illustrates an aspect of an environment 100 in which various embodiments of the present disclosure may be practiced. As illustrated in FIG. 1, the environment 100 may include one or more servers 102 of a distributed system configured to share one or more logical keys, exemplified by logical key 104A and logical key 104B, the logical key being backed by one or more physical keys, depicted in FIG. 1 by physical keys 106A and physical keys 106B. The servers 102 may be any combination of computing devices suitable for performing cryptographic operations, such as web server 1206, application server 1208, and/or any electronic client device 1202 described about FIG. 12.

The servers 102 may cause cryptographic operations to be performed by using a logical key, such as logical key 104A. For example, one of the servers 102 may make a call to an application programming interface requesting a logical key, and the application programming interface may respond by providing the server with a key ID of a logical key, such as "123545" for logical key 104A, which may have been generated by service such as the cryptography service of 1000 described in reference to FIG. 10. Note that the key ID, form of the ID, and the application programming interface are described in this manner for illustrative purposes only, and as such, any manner of generating a virtual key in hardware or software and providing access to that key as would be understood by a person having ordinary skill in the art may be considered as within the scope of the present disclosure. Generation of physical keys to back the logical key, such as the logical key 104A, may occur at the time of the creation of the logical key and/or at a time when the throttle of the logical key is set, and further physical keys may be generated and added to back the logical key as the throttle of the logical key is increased or in response to a request to add more physical keys to back the logical key.

The server of the servers 102 may then perform an encryption operation utilizing the key ID, such as by making another call to an application programming interface and passing the key ID (e.g., encrypt(data, keyID)). The system of environment 100 may respond by selecting a physical key of the logical key 104A, depicted in FIG. 1 as physical keys 106A "12345_001"-"12345_005," but may be more or fewer keys as described in the present disclosure and may, in practice, utilize a different format for key identities as would be known by a person having ordinary skill in the art than that depicted in FIG. 1. The identities of the logical keys, the physical keys corresponding to each logical key, and the throttles associated with the physical keys and/or logical keys may be stored and maintained in a data store, such as a database on a data server of a data storage service of a computing resource service provider.

A particular physical key of the logical key 104A may be selected according to various criteria, including, but not limited to, random selection or other stochastic selection, round-robin selection, weighted round-robin, an attribute of the request (e.g., selecting a key based on a hash value returned after applying a hash function to the request), a type of operation to be performed (e.g., an encryption operation versus a decryption operation), whichever physical key may be present within cache, or a selection based on the usage amount or rate of particular physical keys. In this manner, a cryptographic system may select a physical key, such as key "12345_003" and encrypt data for the requesting server of the servers 102. Upon completion of the encryption, the cryptographic system may respond by appending the key ID (e.g., "12345_003") to the ciphertext, along with any additional metadata that may be desired, and provide the ciphertext to the requesting server of the servers 102. Thereafter, the requesting server may decrypt the data by referencing the key ID of the physical key, by, as an example, passing the key ID of the physical key to an application programming interface (e.g., decryptdata (ciphertext_with_keyID)).

As noted, in environments where usage tracking is an asynchronous process, it may be desirable to ensure that cryptographic keys are changed frequently by attaching a limit to the number of encryption operations may be performed with a given key. For example, if a key is limited for use in, at most, four billion cryptographic operations, then at 1,000 transactions per second, the key will expire in approximately 46 days. However, at a rate of 50,000 transactions per second or more, the key will expire in less than 23 hours and a key rotation process that runs once per day will not be triggered to run until many transactions after the key should have been rotated.

Rather than adjusting the frequency that a key rotation process runs, by throttling the transaction rate of a cryptographic key, the key may be made to expire within an acceptable threshold time before the key is fully consumed. However, it may not be acceptable to a node running a process that runs at 50,000 transactions per second or more to throttle the process down to 1,000 transactions per second. On the other hand it may be acceptable if the process could spread the transactions between 50 keys, each with a throttle of 1,000 transactions per second.

By implementing a key as a logical (i.e., virtual) key that corresponds to 50 physical (i.e., actual) keys, both the goal of running at 50,000 transactions per second and the goal of being able to throttle the usage of actual keys to 1,000 transactions per second may be achieved. The processes performing the cryptographic operations use the logical key 104A as they would use an actual key, for example by calling an application programming interface and passing the ID of the logical key 104A. The executable code behind the application programming interface, however, may be configured to select one of the physical keys 106A belonging to the ID of the logical key 104A to perform the actual encryption operation. The executable code behind the application programming interface may respond to the call with an ID of a key that may be used to decrypt data encrypted with the physical key. Thus, only the logical key 104A may be exposed to the process performing the cryptographic operation.

Each physical key may have its own throttle, giving the logical key 104A a virtual throttle equal to the aggregate of the throttles of the physical keys 106A linked to the logical key 104A. In some embodiments, the virtual throttle may be expressly increased, such as by making an application programming interface call to change the throttle of a logical key 104A to support a greater number of transactions per second, and in fulfillment of the application programming interface call, the system of the present disclosure may add as many physical keys 106A to the logical key 104A as would be needed to for the aggregate of the throttles of the physical keys 106A to meet the new throttle amount of the logical key 104A. As another example, using the example of the logical key 104A with a throttle of 50,000 transactions per second with 50 physical keys, each with a 1,000 transaction per second throttle, if an entity, such as a customer, user, service, application or some other such entity requests that the system of the present disclosure increase the throttle of the logical key 104A to 60,000 transactions per second, the system may fulfill the request by provisioning ten more physical keys having 1,000 transaction per second throttles for the logical key 104A.

The request to change the throttle (i.e., usage rate) of the logical key may be made through an application programming interface supplied by a computing resource service provider. In response to receiving the request to change the throttle, the computing resource service provider or an applicable application, service, or resource of the computing resource service provider may determine to add one or more physical keys to meet the new throttle amount, reject the request for one of a variety of reasons (e.g., the requestor may not have sufficient authority, a logical key may have reached a predetermined limit to the number of physical keys that may back a logical key, the new throttle amount may be above or below a minimum or maximum throttle determined by the computing resource service provider, etc.), or some other such action. In some cases the request to change the throttle may be in the form of a request to perform a cryptographic operation, the performance of which would exceed the throttle of the logical key. Similarly, in these cases, the request may be rejected or delayed (i.e., throttled) to ensure that the rate of cryptographic operations does not exceed the throttle amount, or, in some others of these cases, new physical keys may be provisioned for the logical key in response to the request to perform the cryptographic operation such that the rate of cryptographic operations does not exceed the aggregation of the throttles of the physical keys backing the logical key (i.e., the new throttle amount).

The number of physical keys to add to meet the new throttle amount may be such that, as cryptographic operations are distributed among individual physical keys backing the logical key (that is, as the operations are allocated to particular physical keys according to a distribution scheme, such as random, stochastic, or weighted according to the current usage levels of the physical keys), the usage rates of the individual physical keys do not exceed their respective throttles. The number of physical keys required to meet this objective may be determined by, if the physical key throttle is constant for all physical keys, dividing the new throttle amount by the physical key throttle. Alternately, a difference between the new throttle amount for the logical and the aggregation of the throttles of the backing physical keys may be divided by a physical key throttle amount to determine a number of physical keys to add or remove from backing the logical key. Other methods for determining a number of physical keys as would be understood by a person having ordinary skill in the art may also be considered as within the scope of the present disclosure.

Note that in cases where distribution of cryptographic operations are not necessarily uniform, such as in a probabilistic distribution scheme, a buffer or offset may be factored into the aggregation of throttles of physical keys to ensure that the probability of any individual physical key be used in excess of its individual limit (which may be defined based on a usage rate and/or number of total uses) is within a specified threshold (e.g., (½)^32) or another threshold). For example, a throttle of individual cryptographic keys may be set at a particular level, however due to the particular distribution scheme, a particular cryptographic key may be allocated more cryptographic operations than other keys during a particular time period. To ensure that such a distribution scheme does not unnecessarily cause cryptographic requests to be throttled, a buffer amount may be factored into the physical key throttles when determining how many physical keys to provision for a logical key; e.g., physical keys may be set at 1,000 transactions per second with a buffer of 100 transactions per second to account for uneven distribution of cryptographic operations, such that each physical key may be considered to have an effective throttle of 900 transactions per second for aggregating throttles of physical keys to determine how many physical keys should back the logical key. The values discussed are provided as examples and the actual values used may depend on various factors, such as user preferences, the particular cryptographic primitives being used, and the like.

An aggregation of the throttles of the physical keys 106A may be said to meet the new throttle amount differently depending on the particular embodiment. For example, in some cases the throttle of a logical key 104A may only be increased or decreased by a multiple of the throttle of the physical keys 106A such that the aggregation of the physical key throttles may be made to exactly match the logical key throttle; that is, in an embodiment where physical keys 106A have throttles set at 1,000 transactions per second, a logical key may only have a throttle that itself is a multiple of 1,000. In another example, in some cases, the aggregation of the physical key throttles may only need to exceed the throttle of the physical key. For example, if a logical key having a throttle of 2,000 transactions per second is backed by two physical keys having throttles of 1,000 transactions per second, and the throttle of the logical key is increased to 2,500 transactions per second, adding an additional backing key having a throttle of 1,000 transactions per second may meet the new throttle amount even though the aggregation of the throttles of the backing keys exceeds the throttle set on the logical key 104A. In some of these embodiments, the new throttle amount of the logical key 104A may be met if the aggregation of the physical keys exceeds the new throttle by any amount; for example, a logical key 104A with a throttle set to 5,000 transactions per second having five physical keys 106A of 1,000 transactions per second throttles may have its throttle increased to 6,000 transactions per second; in such a case, adding five more physical keys with 1,000 transactions per second throttles may meet the new throttle, as the aggregation of the throttles of the physical keys 106A becomes 10,000 transactions per second. Consequently, in such an example, if the throttle of the logical key 104A is subsequently increased from 6,000 transactions per second to 7,000, 8,000, 9,000, or 10,000 transactions per second it may not be necessary to add additional physical keys. In other embodiments only a minimum number of physical keys may be added as needed to for the aggregation of the throttles to equal or exceed the new throttle limit, or in a case where the throttle of a logical key 104A is decreased and it is desired to removed keys, the number of physical keys removed may be such that the aggregation of the throttles of the physical keys 106A still exceed the new throttle.

In another example, a logical key 104A may be initially created with a throttle of 1,000 transactions per second, and the logical key 104A may be backed by a corresponding physical key, also with a 1,000 transactions per second throttle. The logical and physical keys 106A may persist in that state some time, at which time the usage the logical key 104A is increased to 2,000 transactions per second, whereupon a second physical key with a throttle of 1,000 transactions per second may be introduced to back the logical key 104A along with the first physical key. At this point, the first physical key may be partially exhausted, and, if operations are shared equally between the first physical key and the second physical key, the first physical key will need to be rotated before the second physical key is fully exhausted. In some embodiments, it may be desirable to swap the first physical key out for a third physical key when the second physical key is added such that all physical keys 106A backing the logical key 104A are exhausted simultaneously. In such an embodiment, it may be further desirable to rotate the logical key 104A when all physical keys 106A are exhausted.

In an embodiment, the logical key 104A may have a certain number of physical keys 106A and, if the number of transactions per second being processed for the logical key 104A exceeds the aggregation of the throttles of the physical keys 106A, the system of the present disclosure may automatically provision additional physical keys as would be sufficient in the aggregate to support the number of transactions per second needed rather than introducing delays to keep the number of transactions below the aggregate throttle. In other words, measurement of a past usage rate for the logical key 104A may be used to determine a new logical key throttle, and hence, the number of physical keys with throttles to provision. In some embodiments, the throttles may be specific to certain types of operations or for use with certain types of services or resources. For example, cryptographic operations performed with a data store may have a different limit to the rate of operations performed than cryptographic operations performed in conjunction with a virtual machine.

Likewise, if the throttle on the logical key 104A is decreased, one or more physical keys 106A of the logical key 104A may be deprovisioned as would be needed for the remaining physical keys 106A, in the aggregate, to meet the new reduced throttle amount. In at least another embodiment, if the transactions per second processed for the logical key 104A drops, an appropriate number of physical keys may automatically be deprovisioned. For example, if a logical key having 50 physical keys with throttles of 1,000 transactions per second finds itself only needing to process 45,000 transactions per second, in this embodiment the system of the present disclosure may deprovision five of the physical keys.

When an encryption operation is performed with a logical key, the ciphertext returned as a result of the encryption operation may include an indication of the unique identity of the physical key used. In some other embodiments, the ciphertext may include an identity of the logical key 104A in addition to the identity of the physical key (e.g., "12345_002" may indicate that the ciphertext was encrypted with the second physical key of logical key "12345"). For example, the ciphertext may be provided serialized with the physical key ID as a protocol buffer (protobuf) and may further include an initialization vector for hiding patterns in encrypted data. In other embodiments, the identity of the physical key and/or logical key may be separately output.

Figure 2:
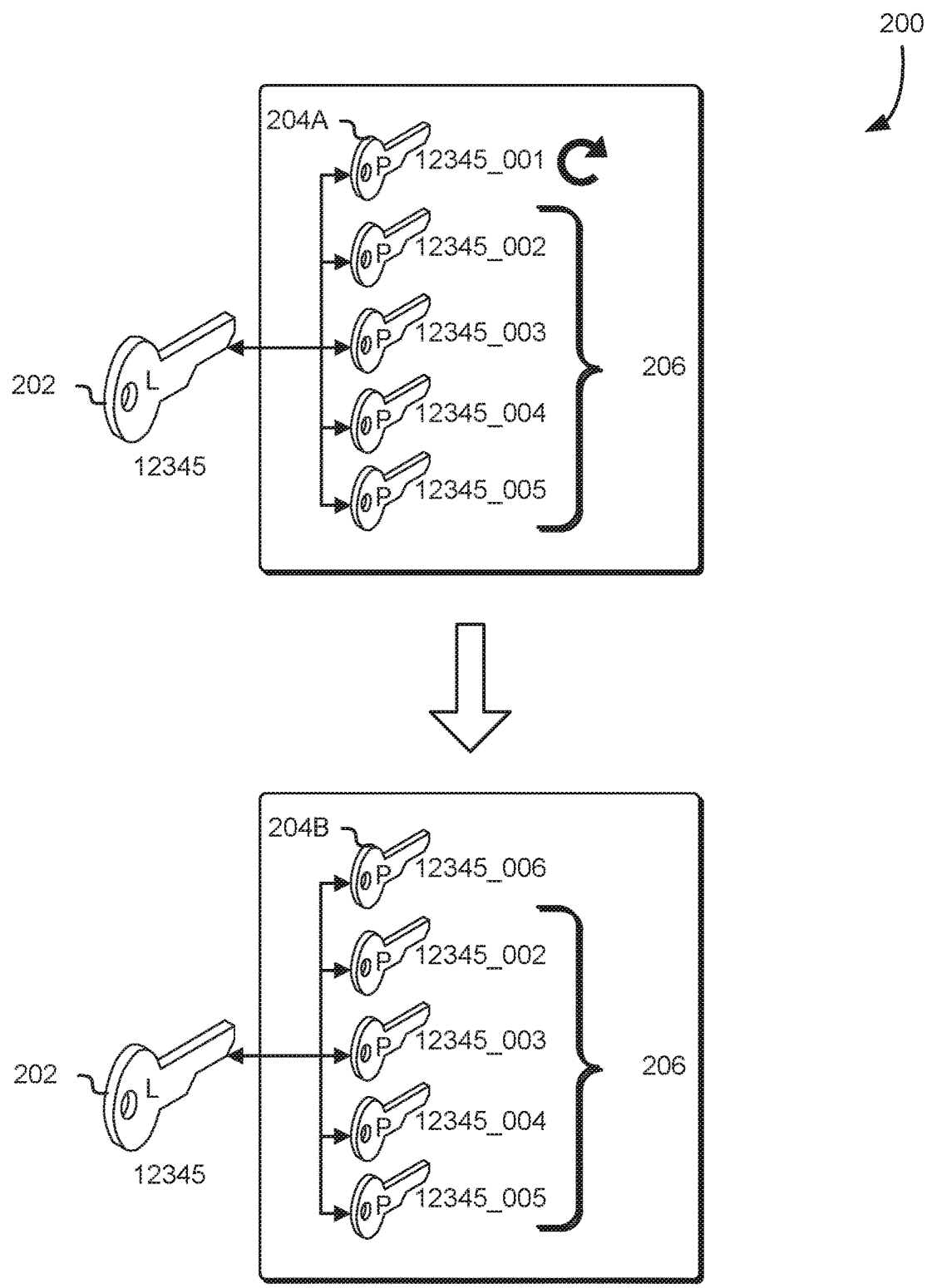
FIG. 2 shows an illustrative example of physical key rotation in accordance with an embodiment.

FIG. 2 illustrates an aspect of an environment 200 in which various embodiments of the present disclosure may be practiced. Specifically, FIG. 2 depicts an example of a logical key 202 in which a physical key 204A of the logical key 202 is rotated independently of other physical keys 206.

In this example, the logical key 202 has five backing physical keys (i.e., physical key 204A and the other physical keys 206). As illustrated, the physical key 204A has reached a stage where it is to be rotated, possibly because it has been exhausted. Physical keys 206 are not being rotated in this illustration, possibly because none of those physical keys 206 have reached their exhaustion point in their usage yet.

The next stage of FIG. 2 shows that the first physical key of the logical key 202 has been rotated, that is, physical key 204A has been replaced with new physical key 204B. The remaining physical keys 206 are left untouched and unaffected by the rotation of physical key 204A. To a user of the logical key 202, the process is nearly transparent; future cryptographic operations are performed using a key selected from physical keys 206 and physical key 204B just as it had been previously selected from physical keys 206 and physical key 204A. In some embodiments, the physical key 204A may be retained for decryption operations only, that is, the physical key 204A may be identified to perform decryption operations on ciphertext that the physical key 204A had encrypted before rotation.

Figure 3:
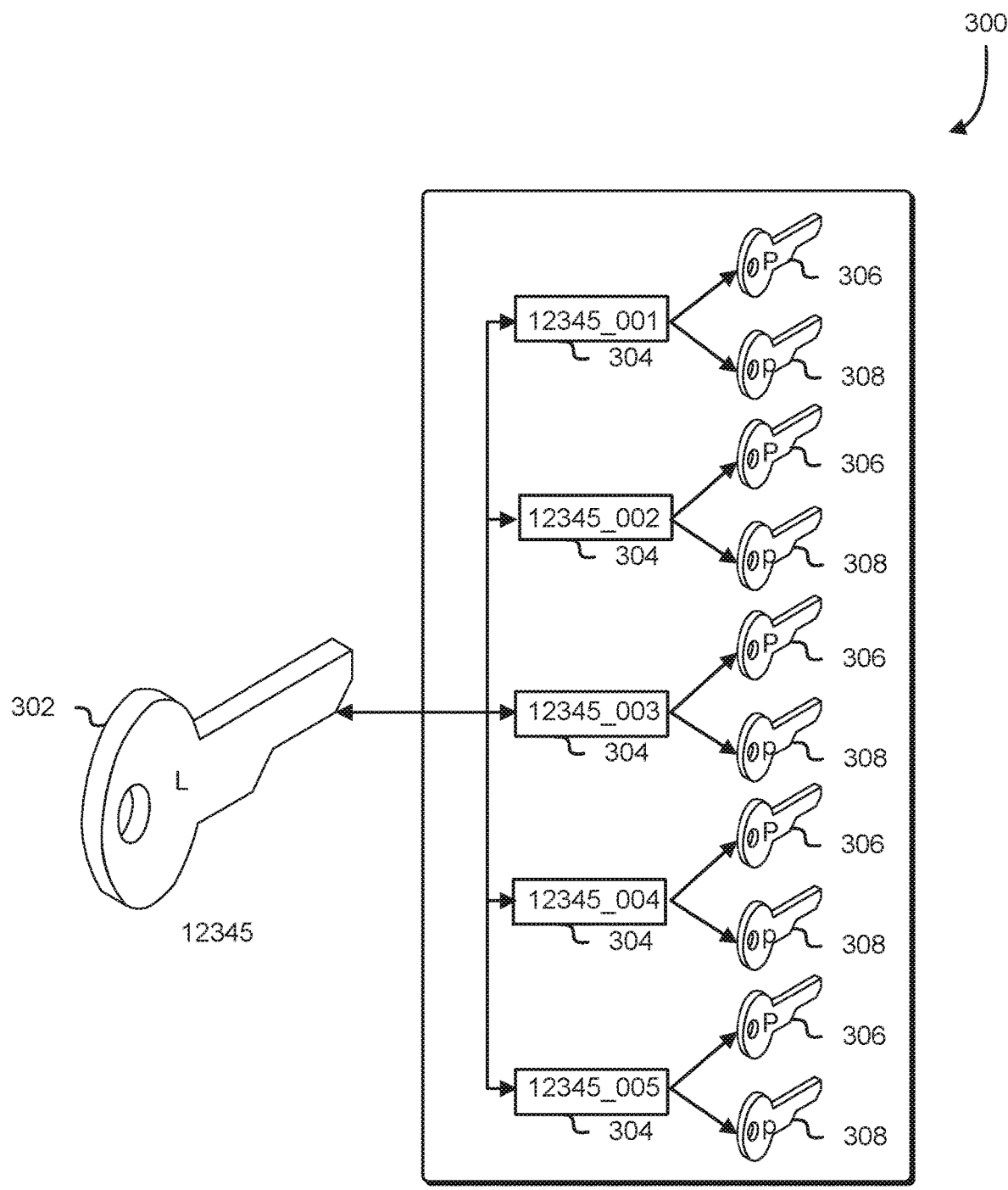
FIG. 3 shows a diagram illustrating a manner in which physical keys may be associated with a public-private key pair.

FIG. 3 illustrates an aspect of an environment 300 in which various embodiments of the present disclosure may be practiced. Specifically, FIG. 3 depicts an example of a logical key 302 backed by five physical key identities 304, the physical key identities may each correspond to pairs of public keys 306 and private keys 308 for encryption and decryption respectively in a public-private cryptography key scheme. In the embodiment of environment 300, when physical keys are provisioned for the logical key, a public-private key pair may be generated to back the logical key for cryptologic operations. For example, a customer may make an application programming interface call to the logical key to perform an encryption operation. The system of the present disclosure may, for reasons including, but not limited to, random or other stochastic selection, round-robin selection, weighted round-robin, selection based on some attribute of the request (e.g., selecting a key based on a hash value returned after applying a hash function to the request) or some other such reason, select a particular physical key identity to perform the encryption operation. The encryption operation may then be performed with the public key of the selected physical key identity. Thereafter, the resulting ciphertext may be provided to the customer along with an identity of the particular physical key used (e.g., "12345_001"). When the customer chooses to decrypt the data, the customer may pass the ciphertext with the identity of the physical key to an application programming interface, which responds by performing a decryption operation using the private key associated with the physical key identity. Furthermore, in this embodiment, when a physical key reaches exhaustion, it may be that a new physical key identity and a corresponding key pair is generated and only the public key is disabled or retired from the old key pair corresponding to the rotated physical key identity. In this manner, the physical key identity may still be used to cause the private key to perform decryption operations on data encrypted with the public key of the key pair, but the public key of the key pair associated with the particular physical key identity may not be used to perform further encryption operations. In some embodiments, the physical key identity may be associated with a single symmetrical key rather than a key pair, and the system of the present disclosure may enforce a rule that allows decryption but not encryption for the symmetrical key associated with the physical key identity when the physical key has been rotated.

Figure 4:
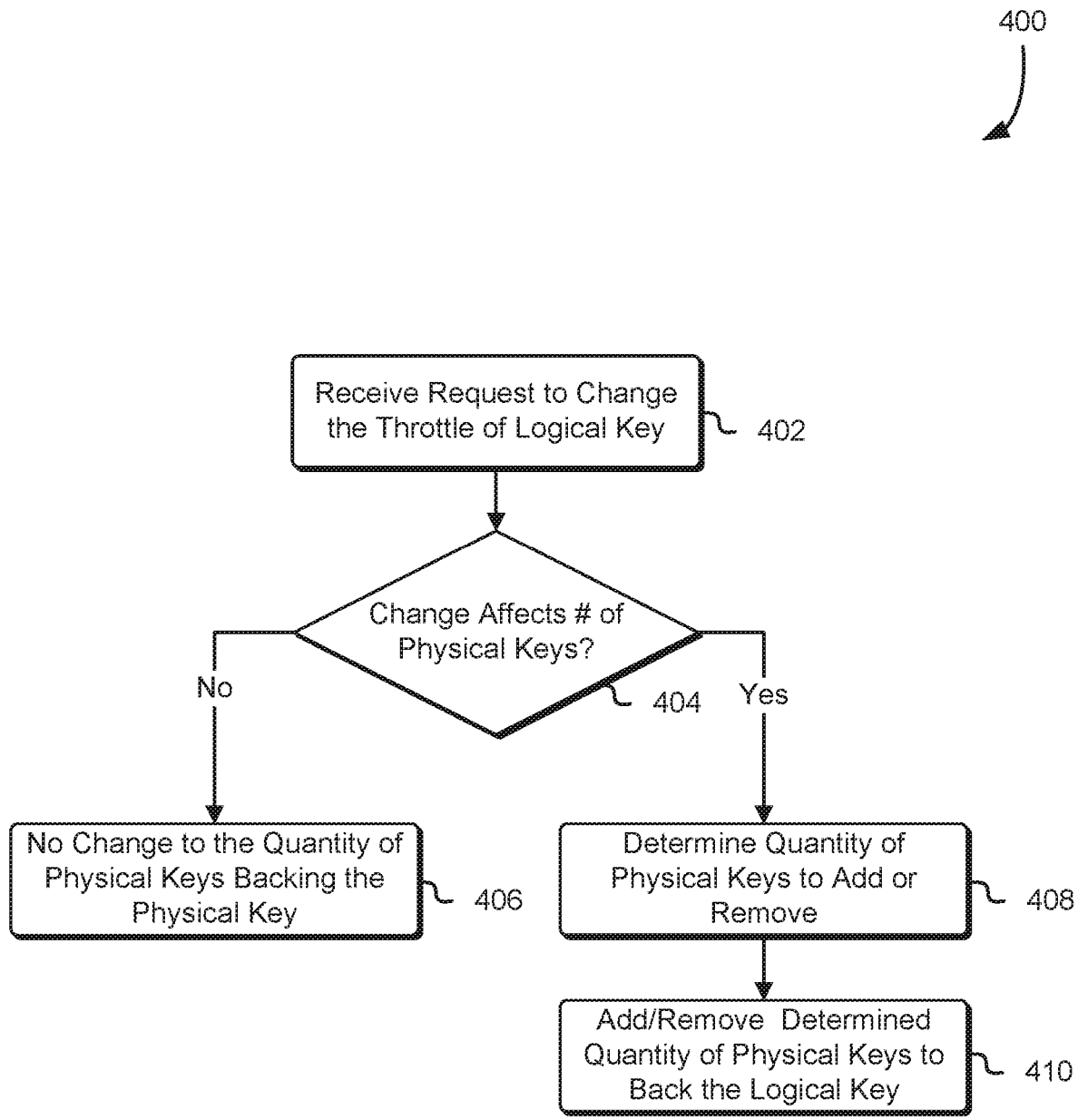
FIG. 4 is a flow chart that illustrates an example of changing the number of physical keys backing a logical key in response to a throttle change request in accordance with an embodiment.

FIG. 4 is a flow chart illustrating an example of a process 400 for increasing the throttle of a logical key by adding physical keys in accordance with various embodiments. The process 400 may be performed by any suitable system such as server, hardware module, integrated circuit, programmable logic device, motherboard, or any electronic client device, such as the electronic client device 1202 described in conjunction with FIG. 12. The process 400 includes a series of operations in which the throttle of a logical key is changed and physical keys backing the logical key are either added, removed, or left alone. In 402, the system performing the process 400 receives a request to change the throttle associated with a logical key. The throttle may be requested to be changed in various ways, such as, the throttle may be requested to be increased or decreased by a certain number of transactions per second, raising or lowering a key rotation frequency (e.g., by affecting the number of cryptographic operations that may be performed by physical keys before exhaustion, the throttle of the physical keys may need to be adjusted in order to ensure that the physical keys are used beyond their exhaustion point, depending on the frequency a key rotation process may be run), requesting that one or more physical keys backing the logical key be added or removed, or some other such way.

In 404, the system performing the process 400 makes a determination whether the requested change will affect the number of physical keys backing the logical key. In some cases, a request to increase the throttle of a logical key may not necessarily cause an increase or decrease in the number of physical keys. For example, if the change is a decrease in the throttle of the logical key and the aggregate throttles of the physical keys exceed the new throttle of the logical key, it may be sufficient not to change the number of physical keys backing the logical key. Whereas in some cases, it may be desirable to keep the number of physical keys at or just above the minimum number of physical keys needed for the aggregation of the throttles of the physical keys to meet or exceed the new throttle of the logical key. On the other hand, if the change to the throttle of the logical key exceeds the aggregation of the throttles of the logical keys backing the logical key, the number of physical keys may be increased.

If the change to the throttle of the logical key is not determined to affect the current number of physical keys backing the logical key, the system performing the process 400 may proceed to 406, and it may be that no further action is taken other than to change the throttle amount associated with the logical key. Otherwise, the system performing the process 400 proceeds to 408 and 410 to determine the physical keys (i.e., determine a sufficient quantity of physical keys and generate the sufficient quantity of keys) to associate with the logical key. In 408 a quantity of physical keys necessary to fulfill the requested throttle amount is determined. As noted, it may be that just enough physical keys with a particular throttle to exceed the desired logical throttle are sufficient; for example, if the logical key is currently backed by two physical keys having throttles of 2,000 transactions per second each and the request is to increase the logical throttle to 5,000 transactions per second, it may be sufficient to only add one more physical key with a throttle of 2,000 transactions per second. Likewise, if the request to change the throttle of the logical key is less than the previous logical key throttle, just enough physical keys may be deprovisioned from the logical key such that the aggregation of the physical key throttles still exceeds the requested logical key throttle. In some embodiments, physical keys may be added or removed in block amounts; such as, the system performing the process 400 may be configured to add or remove blocks of five physical keys at a time and, in the in the previous example, increasing the logical throttle to 5,000 transactions per second may result in the addition of five physical keys of 2,000 transactions per second. In some other embodiments, the throttles of physical keys need not be equal, and one or more physical keys may be added in which the aggregation of the physical key throttles equal the new logical key throttle. For instance, in the above example, the request to increase the throttle of a logical key to 5,000 transactions per second may result in the addition of a physical key with a throttle of 1,000 transactions per second to back the logical key along with the two physical keys of 2,000 transactions per second, or, alternately, the request may result in the addition of a physical key having 700 transactions per second and another physical key having 300 transactions per second, or any such combination in which the aggregation of the physical key throttles equal the logical key throttle.

In 410, based on the determination of 408, the determined number of physical keys may be provisioned to back the logical key or be deprovisioned from backing the logical key. As noted, adding a physical key include generating a public-private key pair, with the public key usable for encryption requests of the logical key and the private key usable for decryption requests of the logical key. Alternately, provisioning a physical key may comprise generating a symmetric key. Also as noted, deprovisioning a physical key may include merely removing or disabling a public key of a public-private key pair associated with a physical key ID, such that further encryption requests may not permitted but decryption requests of data encrypted with the expired public key may still be permitted, or it may be that, in the case of a symmetrical key, an application programming interface determines that encryption may not be performed using an expired key but that decryption requests may be permitted. In some cases, it may be determined that no cryptographic operations may be permitted with an expired physical key, or it may be that further cryptographic operations with an exhausted physical key may only be performed for certain users, customers, services, resources, applications, or specific trusted entities.

Figure 5:
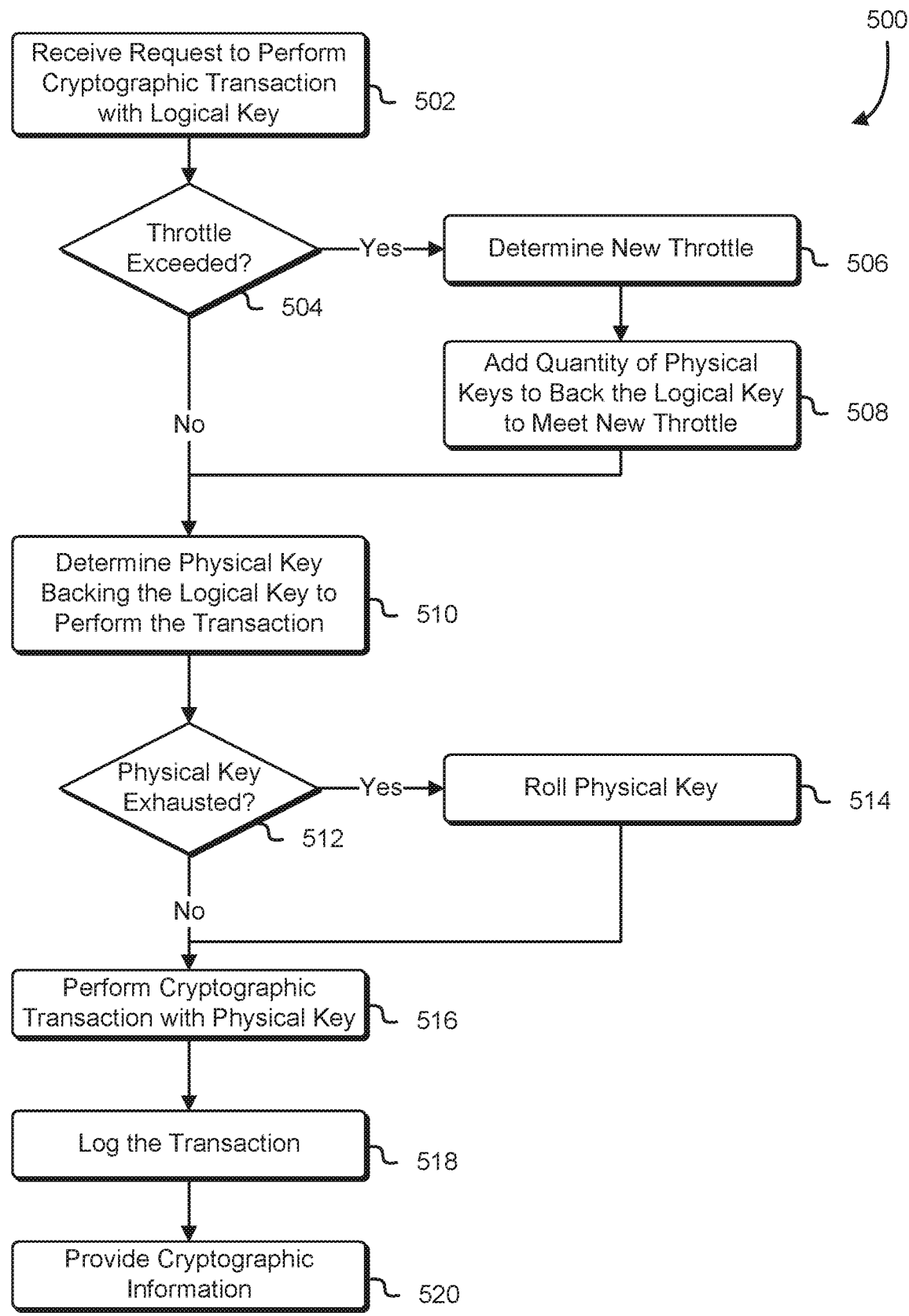
FIG. 5 is a flow chart that illustrates an example of physical key adjustment in response to a throttle change request and physical key rotation in accordance with an embodiment.

FIG. 5 is a flow chart illustrating an example of a process 500 for performing cryptographic operations with a logical key backed by one or more physical keys in accordance with various embodiments. The process 500 may be performed by any suitable system such as server, hardware module, integrated circuit, programmable logic device, motherboard, any electronic client device, such as the electronic client device 1202 described in conjunction with FIG. 12, or any distributed system comprising any combination of the previously mentioned systems. The process 500 includes a series of operations in which a request for performing a cryptographic operation is received, determined whether processing the request may exceed a throttle on the logical key, and determining whether additional physical keys should be provisioned for the logical key to support a new throttle. In 502, a request to perform a cryptographic operation using a logical key is received by the system performing the process 500. Such requests may be received from applications, users, customers, resources, services, and other such entities authorized to request such cryptographic operations from the system. The request may be in the form of an application programming interface request passing data and an ID for a logical key.

In 504, the system performing the process determines whether the throttle of the logical key would be exceeded by performing the requested cryptographic operation. As noted, the throttle may be an individual throttle for the logical key or may be the aggregate throttle of the physical keys backing the logical key. If performing the cryptographic operation would exceed the logical key throttle, the system performing the process 500 proceeds to 506 and a new throttle may be determined. In some embodiments, a determination that fulfilling a request to perform a cryptographic operation may not result in an increase of the logical key throttle, but rather may result in the addition of a delay in performing the cryptographic operation such that fulfilling the request does not exceed the logical key throttle. In such embodiments, it may be that the logical key throttle may instead be increased or decreased from a specific request to increase or decrease the throttle, such as a call to an application programming interface to increase or decrease a logical key throttle. However, in the specific example of 506, a throttle may be determined by calculating a rate of transactions per second that would result from performing the cryptographic operation. In some cases, calculating a new throttle every time the performance of a cryptographic operation exceeds the throttle may generate unwanted system overhead and, as a result, an additional buffer rate may be added to the new throttle amount to reduce the frequency with which the throttle may need to be adjusted.

In 508, one or more physical keys may be added to back the logical key to meet the new throttle amount in a manner similar to that described previously in the present disclosure. In the specific example of 508, physical keys are added due to a determination that a fulfillment of a cryptographic operation request would exceed a throttle, but in other cases it may be that, in 504, that the number of cryptographic operations being performed actually falls below a certain threshold, and in such a case, in 508, a quantity of physical keys may be deprovisioned from backing the logical key rather than added to back the logical key.

If, in 504, it was determined that the throttle of the logical key would not be exceeded by the performance of the cryptographic operation, the system performing the process 500 proceeds to 510. Likewise, the operations of 508 are performed, the system performing the process 500 may also proceed to 510. In 510, the system performing the process 500 determines which physical key of the physical keys backing the logical key to utilize for performing the cryptographic operation. For example, if the cryptographic operation is a decryption operation, the request to perform the cryptographic operation may have included an identity of the physical key that was used to perform the initial encryption. Or, if the cryptographic operation is an encryption operation, the physical key to be used for the encryption operation may be determined stochastically from the physical keys backing the logical key, or could be determined according to a weighted random or pseudo-random scheme, such as weighting at least partially based on how close each of the physical keys backing the logical key are to exhaustion. Alternately, the physical key for an encryption operation may be determined in a round-robin fashion or in a weighted round-robin fashion, whereby some physical keys may be skipped in the rotation depending on the state of exhaustion of the physical key; i.e., keys with high exhaustion may be periodically skipped so that they do not expire early, or alternately keys with high exhaustion may be selected more frequently so that they can be exhausted and removed from the backing keys more quickly.

In 512, a determination is made whether the selected physical key has reached an exhaustion point. If so, it may be that the physical key is rolled in 514. In some embodiments where physical keys are rolled by a periodically running process, the system performing process 512 may instead return to 510 to select a different key (i.e., one that is not exhausted). In some embodiments, 512 may be omitted and the cryptographic operation may be performed in 516 beyond the exhaustion of the physical key and a periodically running process handles the rolling of the physical key.

In 514, if the selected physical key is determined to have been exhausted, the physical key may be rolled (a.k.a. rotated) because it has exceeded a threshold of encryption operations or other cryptographic operations performed. In such a case, the physical key backing the logical key may be replaced with a newly generated physical key, which may be subsequently selected to perform the cryptographic operation in 516. Is some cases, a new physical key is added to back the logical key, however the exhausted physical key may be retained for performing decryption operations on ciphertext encrypted by the exhausted physical key.

Otherwise, if the selected physical key was not exhausted or if the physical key was rolled to a new physical key, in 516, the cryptographic operation is performed with the physical key. In 518, the exhaustion counter of the physical key may be incremented. In some cases other information relating to the cryptography operation may be logged as well, such as a timestamp of when the cryptographic operation was performed, the type of cryptographic operation performed, an identity of the requestor, and other such information.

Finally, in 520, information relating to the cryptographic operation may be provided to the requestor. Such information may include, but not be limited to, in the case of an encryption operation, the ciphertext and information identifying which physical key was used to perform the encryption. In some cases, this information may be provided separately, whereas in other cases the information may be provided at once, such as in a protocol buffer. Additional information, such as initialization vectors, may also be included. In the case of a decryption operation, the decrypted ciphertext may be provided.

Figure 6:
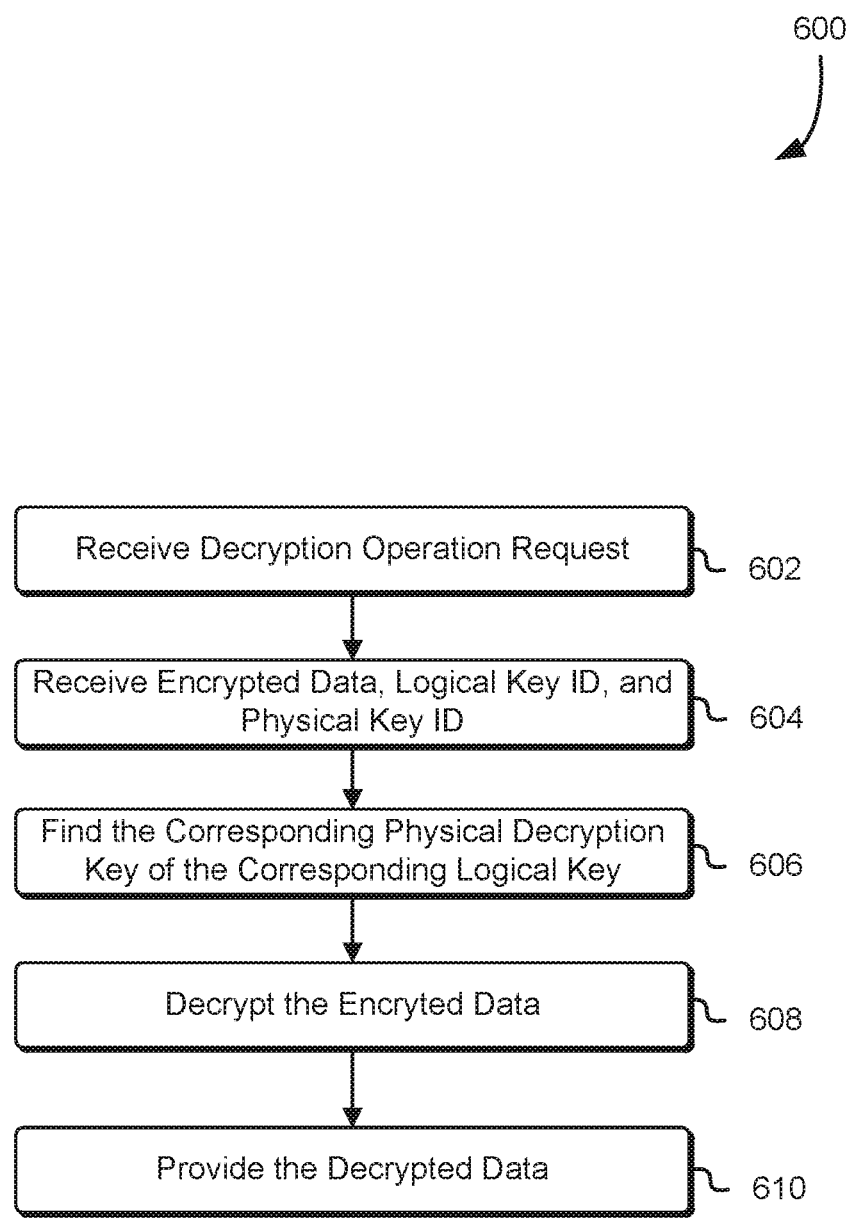
FIG. 6 is a block diagram that illustrates an example of processing a decryption request in accordance with an embodiment.

FIG. 6 is a block diagram illustrating an example of a process 600 for performing a decryption operation in accordance with various embodiments. The process 600 may be performed by any suitable system such as server, hardware module, integrated circuit, programmable logic device, motherboard, any electronic client device, such as the electronic client device 1202 described in conjunction with FIG. 12, or any distributed system comprising any combination of the previously mentioned systems. The process 600 includes a series of operations in which a decryption request is received, along with identifying information, and the data is decrypted using the appropriate physical key. In 602, a request to perform a decryption operation is received by the system performing the process 600. Such requests may be received from applications, users, customers, resources, services and other such entities authorized to request such cryptographic operations from the system.

In 604, encrypted data, a logical key ID, and a physical key ID for performing the decryption operation are received. Note that the encrypted data, logical key ID, and physical key ID of 604 may occur separate from or together with 602, and in some cases the ciphertext may have the logical key ID and/or physical key ID embedded within the ciphertext, such as in a protocol buffer. In 606, the information received in 604 is used to determine which physical key of the logical key to use for the decryption operation. In some cases, the information includes a physical key ID associated with a symmetrical key or a private key of a public-private key pair associated with the physical key ID. In some cases where the particular physical key may have expired due to exhaustion or other reasons, the decryption operation request may be denied or may be permitted only to specific users, customers, applications, services, resources, or some other specially trusted identity.

In 608, the data provided in 604 is decrypted using the physical key determined in 606. After the data is decrypted, in 608, the decrypted data may be provided to the requestor in 610. Alternately, in some cases the decrypted data may be provided to some other entity, such as a data store, at the request of the requestor; in such a case, the destination location of the data may be determined from additional information provided in 604.

Figure 7:
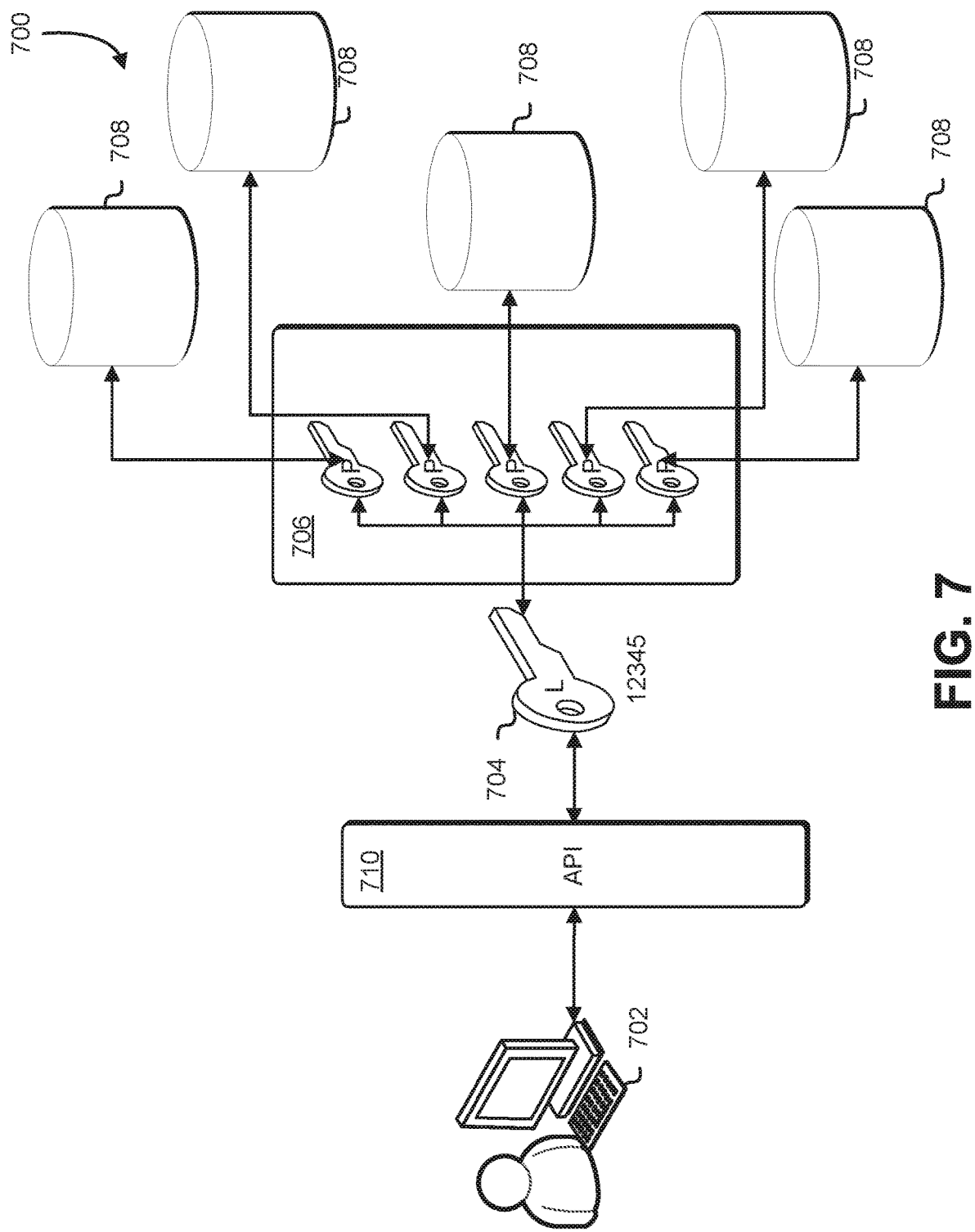
FIG. 7 shows an illustrative example of a logical keys backed by physical keys in a fault isolation environment in accordance with an embodiment.

FIG. 7 illustrates an aspect of an environment 700 in which various embodiments of the present disclosure may be practiced. Specifically, FIG. 7 depicts an example of a system in which physical keys are allocated by fault zones (also known as fault isolation overlays). In this example, an entity 702 requests to perform a cryptographic operation with a logical key 704 (e.g., "12345") and the physical key of the physical keys 706 selected to perform the operation is based on the particular data store of the data stores 708 in the environment 700 used for storing the relevant data. The entity 702 may be a user (e.g., a person operating a device running applications) or any other such entity capable of submitting and being authorized to submit cryptographic operations.

Fault zones are logical divisions of resources such that failure of one fault zone may not affect the other zones. Fault zones may differ based on the type of failures being isolated. Examples of different failure types may include, but not be limited to, power outages, civil unrest, hard drive failures, natural disasters, extreme weather conditions, and other such failures. As a result, fault zones may be divided into one or more different categories, including, but not limited to, geographic regions, data centers, rooms in a data center, server racks in a data center, individual servers, hard drive clusters, backup generators, and other such methods of dividing computing resources for fault isolation. In some cases, different types of fault zones may be nested within other fault zones (i.e., hierarchical), however in other cases some types of fault zones may overlap or be isolated from other types of fault zones.

A logical key may further be used with variable backing physical keys assigned to fault zones to provide fault tolerance and fault isolation for cryptographic operations. In one embodiment, a multitude of physical keys may be generated for a logical key such that, if one or more physical keys corresponding to a fault zone of the logical key is lost or compromised, the amount of data affected by the lost or compromised keys may be minimized. Alternately, the number of physical keys backing a logical key may be related to a usage level of the physical key; that is, rather than or in addition to a throttle related to number of operations in a certain time period, there may be a limit set on the number of volumes in a distributed computing environment using a particular physical key during a certain period of time. For example, a limit may be set on physical keys such that they may not be used with more than 100 volumes, meaning that the loss of the key will affect only 100 volumes at most. In this example, then, for a logical key to be used for 1,000 volumes, the logical key may be backed by 10 physical keys. In some cases a customer of a computing resource service provider may specify a usage limit for a physical key of a logical being used. In other embodiments, a logical key may be shared between different fault zones, and physical keys may be allocated depending on the fault zone of the request for a cryptographic operation originates.

The usage limit of a logical key may be increased or decreased similar to how the throttle of a logical key may be increased or decreased. As an example, a logical key may have five physical keys with usage limits set to 100 volumes each, giving the logical key the ability to be used with 500 volumes (i.e., the aggregation of the usage limits of the five physical keys). If a customer decides to use the logical key with 600 volumes, the system of the present disclosure may add another physical key with a usage limit set to 100 volumes to the physical keys of the logical key to bring the aggregated usage limits of the physical keys to 600 volumes. As another example, a customer of a computing resource service provider may utilize services spread over multiple geographic fault zones, but the services may share the same logical key. In such an example, different physical keys may be assigned to the different geographic fault zones such that, when a request is received to perform an operation using the logical key, a determination is made to determine from which geographic fault zone the request originated and the corresponding physical key is assigned to the request. In this manner, should a physical key for the logical key be lost due to a catastrophic event at the geographic fault zone, services utilizing the logical key for other geographic fault zones may be unaffected by the loss of the physical key. In some embodiments, the physical keys may be managed and contained within one or more hardware security modules.

In some cases, the usage limit of the logical key may increase/decrease and physical keys added/removed as needed according to actual use of the logical key. In other cases, an entity may make a request that the usage limit of a key be changed, such as through an application programming interface.

When the entity 702 makes a request to perform a cryptographic operation, such as an encryption operation on data to be stored in a data store like the data stores 708, the entity 702 may pass the data to be encrypted to an application programming interface 710 and may identify the logical key 704 to perform the operation. Alternately, there may be logical keys in the environment 700 and the application programming interface 710 may select the logical key 704 from available logical keys.

In some embodiments, when a volume is created, a physical key may be selected according to one of the selection schemes described, and the physical key may thereafter be associated with that volume. If a volume is to be created and associated with the logical key 704, but all physical keys 706 backing the logical key 704 have reached their usage limits, a new physical key may be provisioned into the physical keys 706 and associated with the new volume. In this manner, for example, if the usage limit is set to be 100 volumes, the loss of a particular physical key only causes the loss of a maximum of 100 volumes associated with the logical key 704, and the volumes of the surviving physical keys of the backing physical keys 706 may be unaffected.

The physical keys 706 may be associated with different fault zones; in this case, each fault zone refers to a different data store of the five data stores 708. The data stores may be present on one or more machines in a distributed system, such as in an environment of a data storage service. The data may be stored in the data stores in a variety of ways, including, but not limited to, each portion of submitted data may be stored in whole or in part on the data stores 708 or striped the data across a redundant array of independent disks (e.g., data stores 9008). In this way, if one of the keys 706 is lost or compromised, or if one of the data stores 708 is lost or damaged, 80% of the remaining keys and data stores may be left healthy and unaffected.

Thus, for an encryption operation, a physical key may be selected from among physical keys 706 to perform the encryption operation. Upon completion of the encryption operation, the data may then be stored in a data store corresponding to the selected physical key. In some cases, the data may be subdivided and multiple physical keys 706 may be used to encrypt and store the portions of the encrypted data in the data stores 708 corresponding to the multiple physical keys 706.

Figure 8:
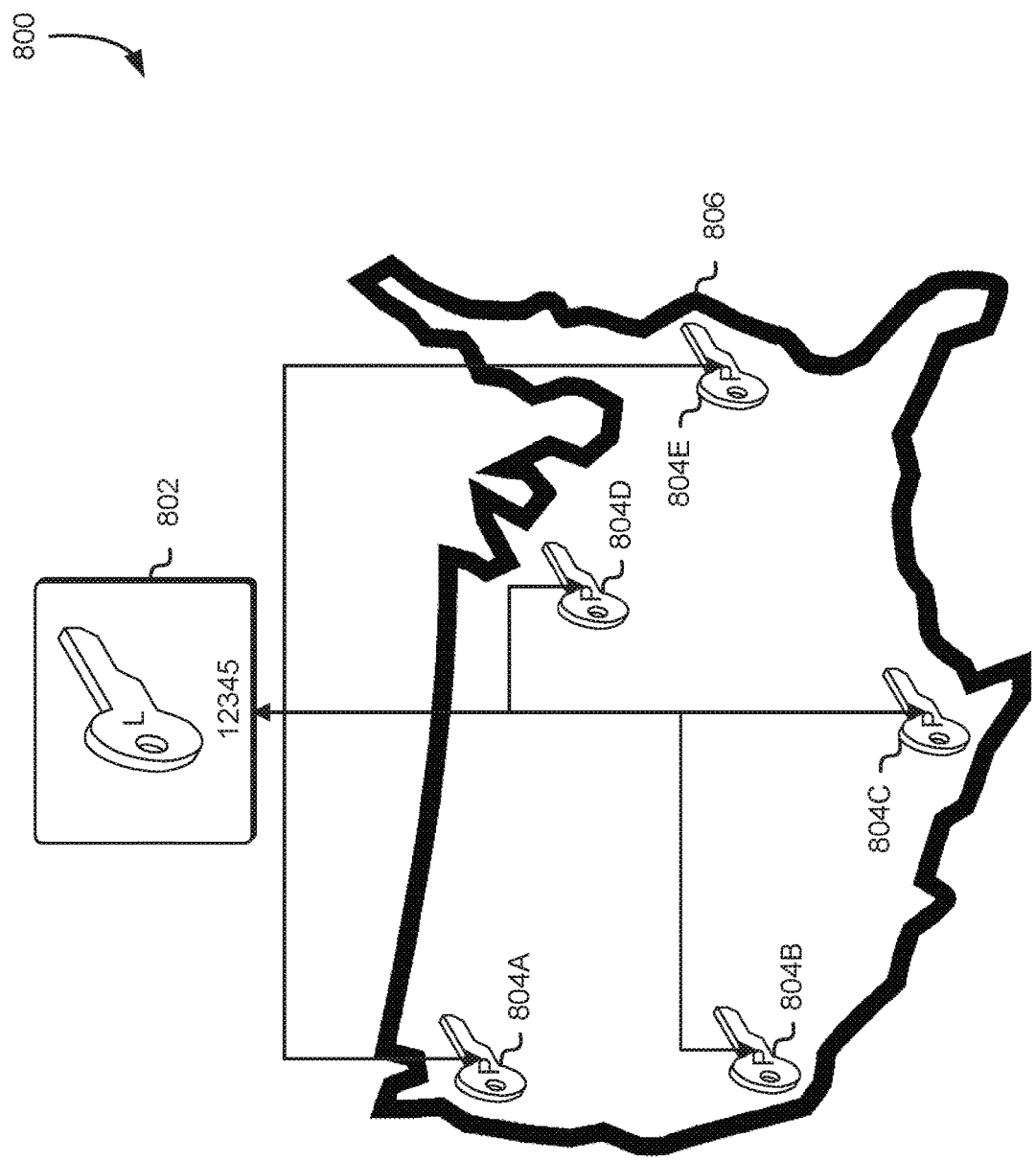
FIG. 8 shows an illustrative example of a logical keys backed by physical keys in a geographic fault isolation environment in accordance with an embodiment.

FIG. 8 illustrates an aspect of an environment 800 in which various embodiments of the present disclosure may be practiced. Specifically, FIG. 8 depicts an example of a logical key 802 backed by multiple physical keys 804A-804E corresponding to fault zones associated with different geographic regions. Note that the physical keys 804A-804E depicted in FIG. 8 are each intended to represent one or more physical keys. In this embodiment, a logical key 802 may be shared among servers or other devices located in geographic fault zones (also known as fault isolation overlays or availability zones) associated with geographic regions, such as in variously located data centers, as can be seen on an example map 806.

In an embodiment, when an entity makes a request to perform a cryptographic operation using the logical key 802, a determination is made as to what geographic fault zone the cryptographic operation will be performed in. Once the determination is made, a physical key may be selected from the one or more physical keys associated with the determined geographic fault zone; for example, if the cryptographic operation will be performed at a data center located in the northwest region, a physical key may be selected from the physical keys 804A. In this manner, a customer of a computing resource service provider having applications, services, and resources distributed among different geographic regions for reasons such as redundancy and/or providing faster bandwidth to clients of the customer located near the regions, may utilize the same logical key 802 for cryptographic operations, but the physical key of the plurality of physical keys 804 backing the logical key 802 actually used for the cryptographic operation may be associated with the particular region hosting the devices making the demand for the cryptographic operation. For example, a customer may be a vendor at an online marketplace using logical key for ensuring secure transactions between the vendor and purchasers of the vendor's products. By distributing the backing physical keys 804 among different geographic regions, the customer may be assured that should one of the plurality of physical keys 804 compromised or data centers be rendered inoperative due to some unforeseen event, such as earthquake, flood, political unrest, or extreme weather, the remaining data centers may still refer to the same logical key 802 without disruption and cryptographic operations performed at the remaining locations may be unaffected.

Furthermore, as described, a usage limits may be associated with the geographic fault zones. For example, a usage limit of 100 volumes may be set on individual physical keys of the physical keys 804A-804E associated with the logical key 802, with the usage limit reflecting the maximum number of volumes a computing resource service provider determines it can afford to lose if a particular physical key is lost or compromised. A usage limit may be associated with the logical key 802 to reflect the group usage limit for each geographic fault zone. That is, if the logical key 802 is set with a usage limit of 500 volumes, the usage limit may be met by the northwest region having five physical keys 804A having usage limits of 100 volumes. In this manner, if a natural disaster should cause the physical keys 804A to be lost, the logical key may still be used by the other geographic regions, and only a maximum of 20% of volumes associated with the lost physical keys 804A may be lost.

A usage rate may be associated with the logical key 802. In an embodiment, the usage rate of the logical key 802 may represent a group usage rate; that is, the usage rate may reflect a quota or throttle for cryptographic operations performed by the keys associated with the individual geographic fault zones. As an example of this embodiment, the logical key 802 may have a throttle of 50,000 transactions per second, which may be met by each group of physical keys 804A-804E having 50 physical keys of 1,000 transactions per second, yielding a total of 250 physical keys assigned to the logical key 802. In some embodiments, the physical keys 804A-804E in different regions may have different physical key throttles. For example, in the situation where the logical key 802 has a throttle of 50,000 transactions per second, there may be 25 physical keys in the group of physical keys 804A each having throttles of 2,000 transactions per second while there may be 50 the physical keys in the group of physical keys 804B each having throttles of 1,000 transactions per second. In some embodiments, the logical key 802 may have separate logical key throttles corresponding to each geographic fault zone. In other respects, in other regards, the logical key throttle may operate as previous described in the various embodiments of the present disclosure.

Figure 9:
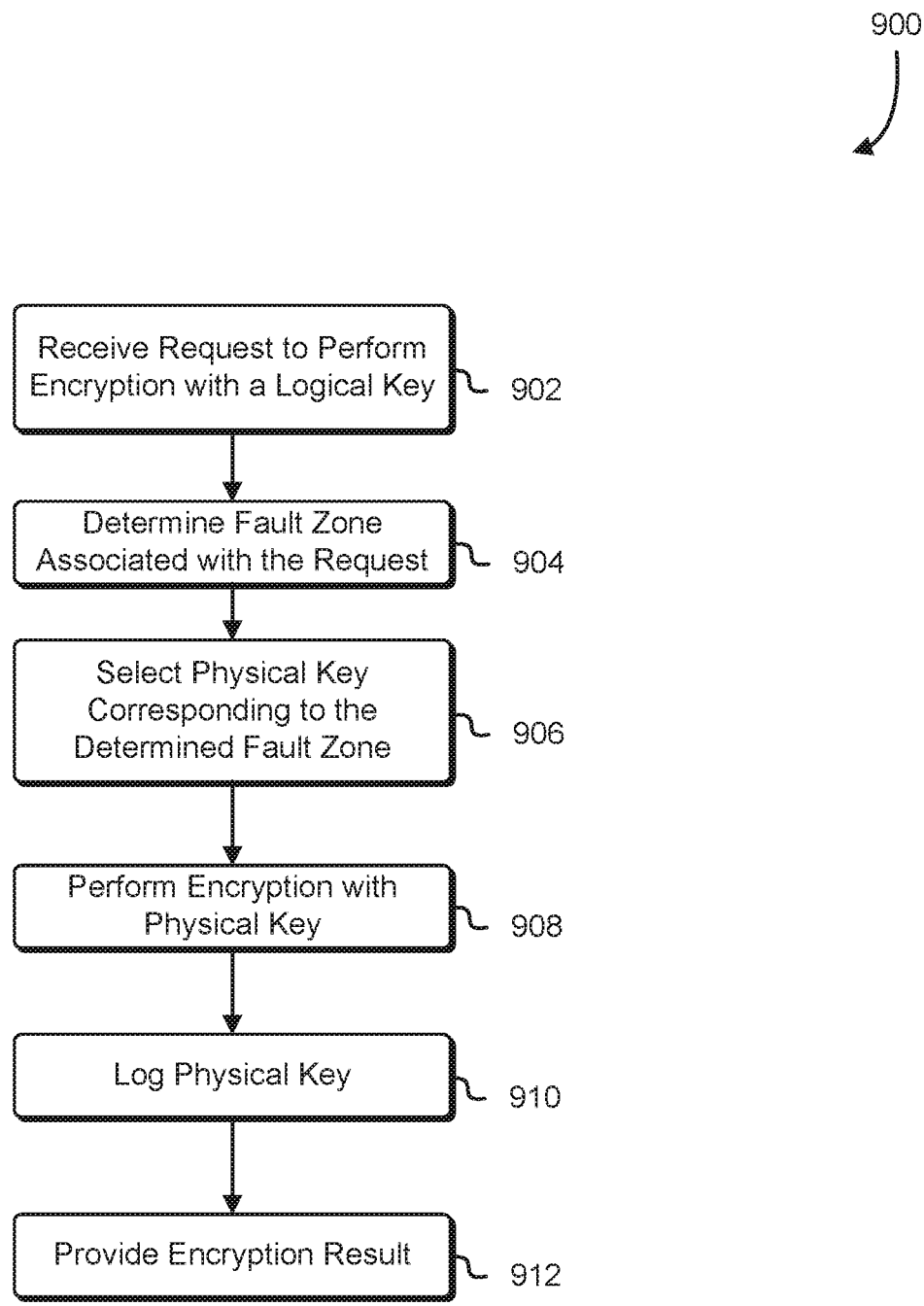
FIG. 9 is a block diagram that illustrates an example of processing an encryption request in a fault isolation environment accordance with an embodiment.

FIG. 9 is a block diagram illustrating an example of a process 900 for performing an encryption operation with a logical key in a fault tolerant system in accordance with various embodiments. The process 900 may be performed by any suitable system such as server, hardware module, integrated circuit, programmable logic device, motherboard, any electronic client device, such as the electronic client device 1202 described in conjunction with FIG. 12, or any distributed system comprising any combination of the previously mentioned systems. The process 900 includes a series of operations in which a request is received to perform an encryption operation with a logical key, a physical key is determined to perform the encryption operation according to a relevant fault zone, performing the operation, and providing the results of the encryption operation. In 902, the system performing the process 900 receives a request to perform an encryption operation using a logical key shared by systems distributed among multiple fault zones. The request may include the data to be encrypted and a logical key ID, or the relevant logical key may be selected from available logical keys as a result of the requestor making a call to an application programming interface. Examples of fault zones include, but are not limited to, geographic regions, rooms of a data center, server racks of a data center, groups of servers supported by particular backup generators, hard drive clusters, and other such methods of dividing computing resources for fault isolation.

In 904, the relevant fault zone may be determined and in 906, the physical key for performing the encryption request may be determined. For example, one or more physical keys may be associated with a particular fault zone and a physical key may be selected from those one or more physical keys associated with the fault zone corresponding to the requestor or corresponding with a location of the data or a destination location of the data. Furthermore, some fault zones may overlap each other. For example, a data center may have three server racks each considered to be a separate fault zone, and may also have two backup generators, with each backup generator supporting half of each server rack. In such an example, it may be that different physical keys backing the same logical key are associated with the server rack fault zones and the backup generator fault zones. By further distributing the physical keys among different types of fault zones as well as among the different fault zones, the logical key may be more resistant to different types of faults.

In 908, after having determined the physical key to use for the determined fault zone, the requested encryption result may be performed using the determined physical key. In 910, the exhaustion counter of the physical key may be incremented. In some cases other information relating to the cryptography operation may be logged as well, such as a timestamp of when the cryptographic operation was performed, the type of cryptographic operation performed, an identity of the requestor, and other such information. Lastly, in 912, the results of the encryption requests are provided. In some cases, the results may be provided to the requestor. In other cases, the results may be provided to some other designated entity, such as an application or data store on a data server of a data storage service. In some embodiments, an identity of the physical key and/or logical key used may be provided with the result, such as in a protocol buffer of the ciphertext.

Note that, unless otherwise specified, expressions regarding executable instructions (also referred to as code, applications, agents, etc.) performing one or more operations that instructions do not ordinarily perform unaided (e.g., transmission of data, calculations, and the like) denote that the instructions are being executed by a machine, thereby causing the machine to perform the specified operations.

Figure 10:
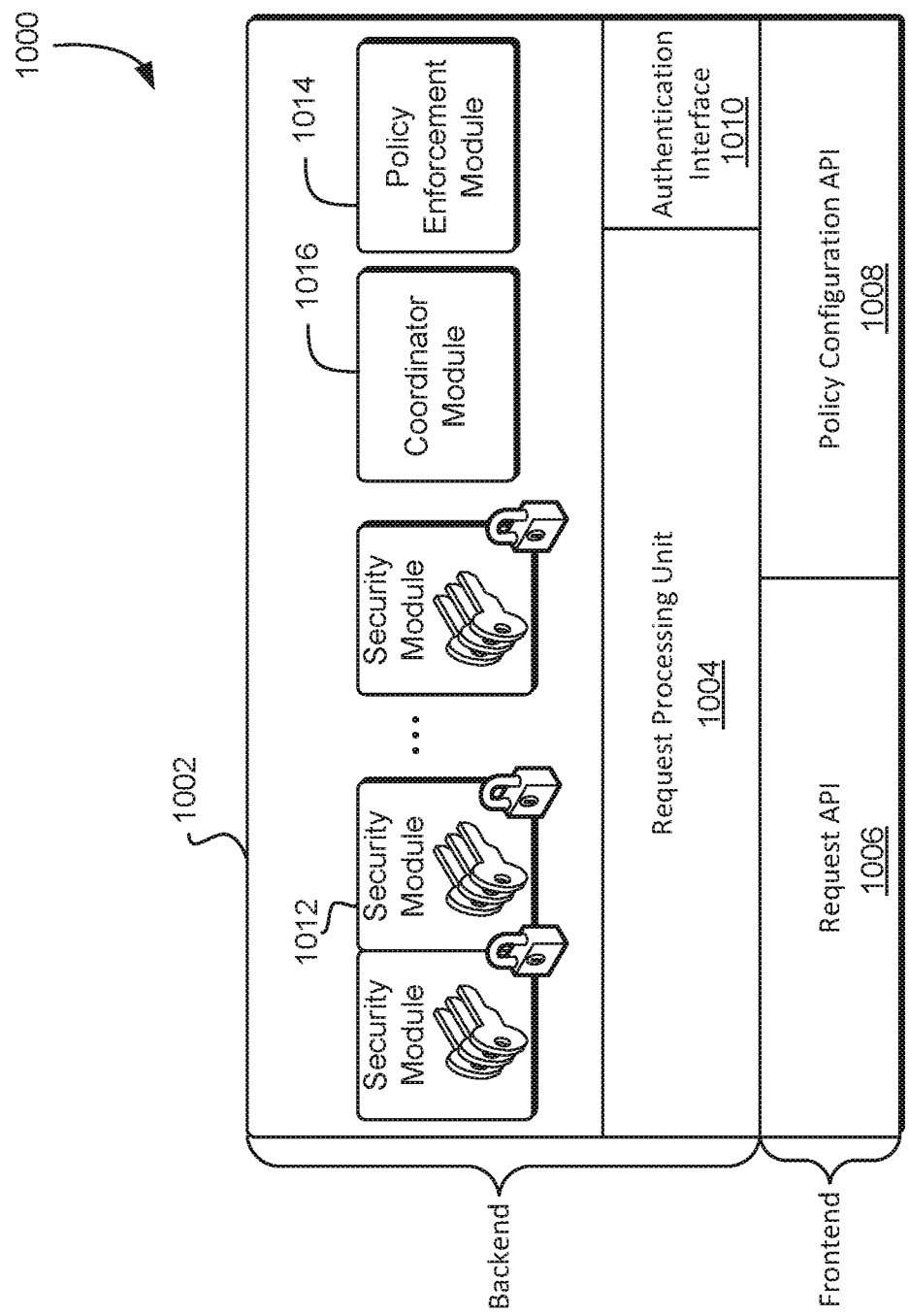
FIG. 10 shows an illustrative example of a cryptography service in accordance with an embodiment.

As illustrated in FIG. 10, the cryptography service 1000 includes a backend system 1002 that itself comprises various components in some embodiments. For example, the backend system in this example includes a request processing system (unit) 1004 which may be a subsystem of the cryptography service 1000 that is configured to perform operations in accordance with requests received through either the request API 1006 or the policy configuration API 1008. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 1010 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1000 also, in this illustrative example, includes security modules 1012 (cryptography modules), a policy enforcement module 1014, and a coordinator module 1016. The security modules may be hardware security modules although, in various embodiments, a security module may be any suitable computer device configured according to have capabilities described. Each security module in an embodiment stores keys associated with KeyIDs. Each security module may be configured to securely store the keys so as to not be accessible by other components of the cryptography service 1000 and/or other components of other systems. In an embodiment, some or all of the security modules are compliant with a security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1000 securely stores keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being within the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described, numerous variations are considered as being within the scope of the present disclosure. For example, FIG. 10 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 11:
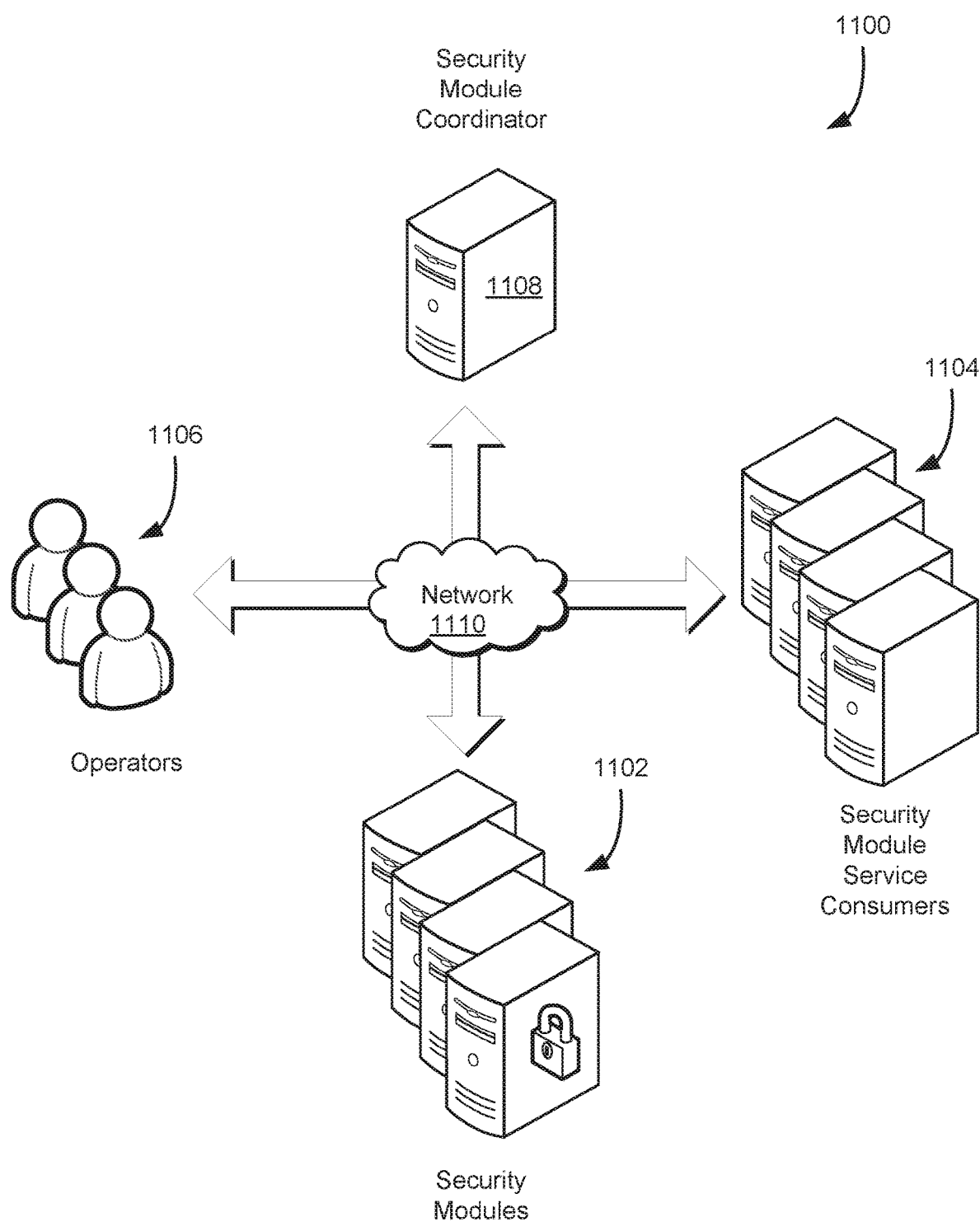
FIG. 11 shows an illustrative example of an environment in which various embodiments can be implemented.

FIG. 11 shows an illustrative example of an environment 1100 in which various embodiments may be practiced. The environment 1100 may be, for example, a distributed system such as described above. The distributed system may form a cryptography service such as described in detail in connection with FIG. 10. In an embodiment, the environment 1100 includes various nodes such as security modules 1102, security modules service consumers 1104, and operators 1106 such as described above. While the operators 1106 are illustrated with human forms in FIG. 11 as discussed, the operators communicate in the environment 1100 with associated computing devices referred to as operator computing devices and simply as operators. In other words, the term "operator" is intended to refer to a computer system which may operate pursuant to input of a human operator and/or an automated process. In some embodiments, an operator is associated with a human operator, at least in some points in time, such as when an operator has used credentials to log into a device, although such associations may not be permanent.

The environment 1100 may also include a security module coordinator 1108 (also referred to as a coordinator module), which may be a computer system configured to orchestrate administrative processes for the environment 1100. For example, the security module coordinator 1108 may be configured with executable code that causes the security module coordinator 1108 to coordinate cryptographic key rotation among the security modules 1102. The security module coordinator 1108 may also perform other administrative operations such as scheduling and orchestrating the update of cryptographic domains and/or domain trusts. Example operations and manners for performing operations are described in U.S. patent application Ser. No. 13/916,915, filed Jun. 13, 2013, and titled "Device Coordination," which is incorporated by reference. Other operations, including operations performed in connection with establishing and maintaining secure sessions are described in U.S. patent application Ser. No. 13/916,964, filed Jun. 13, 2013, and titled "Negotiating a Session with a Cryptographic Domain," which is incorporated by reference. In some embodiments, for example, a group of operators 1106 may authorize and update to a domain and/or domain trust. The information being updated may be digitally signed by a quorum of the operators 1106 (i.e., by one or more individual operators who collectively (or individually, if only one) form a quorum), where a quorum is defined in accordance with a set of quorum rules of a cryptographic domain installed on a set of the security modules 1102, which may be the security modules identified in the current domain.

An operator may provide the authorized update to the security module coordinator 1108 which may perform one or more work flows to ensure that the update is installed on an appropriate set of security modules, such as a set of security modules identified in the update, if the update is to a cryptographic domain. In this manner, the operators 1106 need only be concerned with obtaining proper authorization and the security module coordinator 1108 handles the propagation of updates throughout the environment 1100 as appropriate and according to particular updates being made. As discussed above, cryptographic domains may define various parameters in which a distributed system may operate. A cryptographic domain may be defined by a domain token.

Furthermore, the security module coordinator 1108 may be responsible for rotation of physical key and/or logical keys of the present disclosure. For example, a scheduled background may execute periodically, such as every 24 hours, on the security module coordinator 1108 to determine whether cryptographic keys used in the environment 1100 have reached their exhaustion threshold (or exhaustion point) (e.g., physical keys may be set to expire after performing four billion cryptographic operations), have approached within a certain range of their exhaustion threshold (e.g., a key may be rotated if it is greater than 95% exhausted) or are otherwise flagged for rotation, such as if the security of a cryptographic key has been compromised. An exhaustion threshold is a stage of the usage of a cryptographic key at which it is desirable to expire and rotate the key. In some embodiments certain types of cryptographic operations (such as encryption operations) may count toward the exhaustion threshold, whereas other types of cryptographic operations (such as decryption operations) may not count against the exhaustion threshold. In some embodiments, decryption operations may count against the exhaustion threshold while encryption operations do not count against the exhaustion threshold.

The exhaustion threshold may be a fixed number of cryptographic operations (e.g., four billion, etc.) or timestamp indicating when to expire the cryptographic key, may be a proximity to a fixed number (i.e., within a range of 95% to 100% of four billion) or proximity to a future timestamp, may be a flag or other indicator from an entity that the cryptographic key should be expired and rotated for any of a variety of reasons, or may be some other manner of indicating when a cryptographic key should be rotated as would be understood by a person having ordinary skill in the art. The security module coordinator 1108 may further be configured to log (i.e., track) the usage of each cryptographic key (e.g., incrementing a counter and/or timestamp for a cryptographic key each time it is used) in order to determine how near the cryptographic key is to exhaustion threshold and/or a rate of usage of the cryptographic key. A network 1110 may be any suitable network, such as a public or private network like a local area network, a wide area network, wireless network, distributed network or the Internet.

Note that the security module coordinator 1108 may be configured to track the usage of cryptographic keys using a sampling scheme, probabilistic scheme, or some other such scheme where exact usage of a particular physical key may not be known. For example, the security module coordinator 1108 may log only every Nth cryptographic operation performed or may estimate key usage calculated based on a probabilistic distribution scheme for distributing cryptographic operations to physical keys backing a logical key. In some examples, to reduce the amount of resources needed to process logs, logs are sampled and samples of the logs are used to statistically estimate usage. In such a scheme in which the exact usage of a particular physical key may be not be known, a buffer or offset may be factored into determining whether the physical key has reached an exhaustion threshold to ensure that the physical key is not used to an excess.

Cryptographic operations that may be performed in various embodiments include, but are not limited to, digital signature generation, digital signature verification, encryption, decryption, and random number generation. Operations that utilize cryptographic keys include, but are not limited to, public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Figure 12:
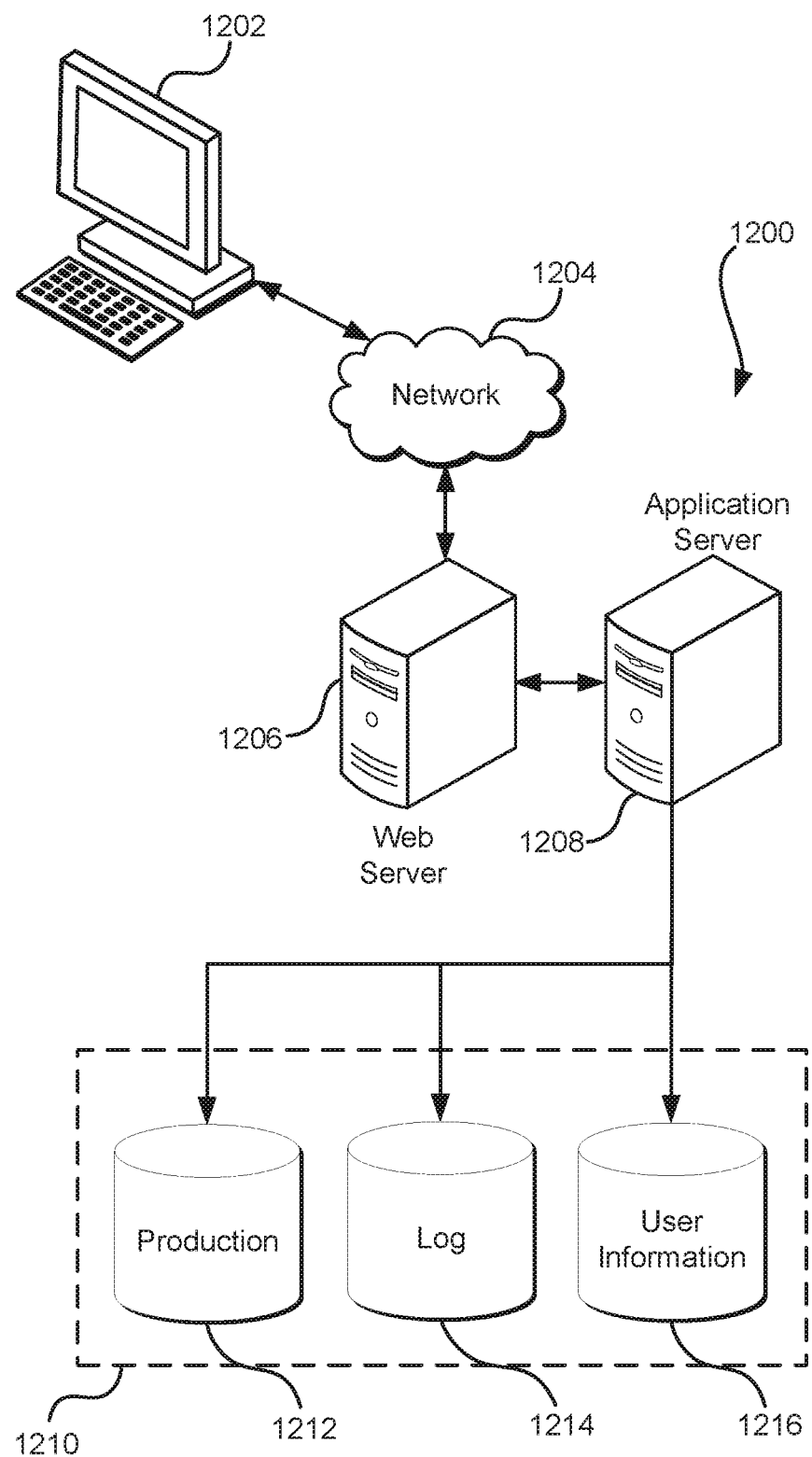
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes an application server 1208 and a data store 1210. It should be understood that there can be several application servers, layers, or other elements, processes, or components, which may be chained or otherwise configured, which can interact to perform tasks such as obtaining data from an appropriate data store. Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, and executable code can be executed on any appropriate device or host machine as discussed elsewhere. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any and all examples, or exemplary language (e.g., "such as"), is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A computer-implemented method, comprising:
   obtaining a request to generate a physical key associated with a logical key;
   generating the physical key;
   associating the physical key with a set of physical keys to be used in performing cryptographic operations involving the logical key by at least adding the physical key to the set of physical keys;
   associating the set of physical keys with the logical key; and
   providing information identifying the logical key in response to the request to allow the logical key to be used to perform the cryptographic operations on one or more hardware processors.

2. The computer-implemented method of claim 1, wherein the computer-implemented method further comprises:
   obtaining an additional request indicating a modification of a throttle associated with the logical key;
   determining a number of physical keys to add to the set of physical keys to satisfy the modification;
   generating an additional set of physical keys based at least in part on the number of physical keys; and
   associating the additional set of physical keys to the logical key by at least adding the additional set of physical keys to the set of physical keys.

3. The computer-implemented method of claim 1, wherein the computer-implemented method further comprises:
   determining a number of uses of the physical key has been exhausted; and
   rotating the physical key.

4. The computer-implemented method of claim 3, wherein rotating the physical key further comprises:
   preventing the physical key from being used to encrypt data;
   generating an additional physical key; and
   adding the additional physical key to the set of physical keys associated with the logical key.

5. The computer-implemented method of claim 1, wherein the request is generated in response to a throttle rate associated with an additional physical key of the set of physical keys associated with the logical key.

6. The computer-implemented method of claim 1, wherein the computer-implemented method further comprises determining a throttle rate associated with the logical key based at least in part on a set of throttle rates associated with the set of physical keys.

7. The computer-implemented method of claim 6, wherein the computer-implemented method further comprises modifying the throttle rate associated with the logical key to meet a quota for a transaction rate associated with the logical key by at least adding an additional set of physical keys to the set of physical keys to increase the throttle rate associated with the logical key.

8. A system, comprising:
one or more processors; and
memory storing instructions that, as a result of execution by the one or more processors, cause the system to:
obtain a request to create a logical key;
generate a cryptographic key;
assign the cryptographic key to a set of cryptographic keys associated with the logical key, where the cryptographic key is a first member of the set of cryptographic keys and the set of cryptographic keys is used to perform a set of cryptographic operations involving the logical key; and
provide information identifying the cryptographic key and the logical key in response to the request.

9. The system of claim 8,
wherein the cryptographic key is a first cryptographic key; and
wherein the instructions further include instructions that, as a result of execution by the one or more processors, cause the system to rotate the logical key by at least:
deprovision a second cryptographic key of the set of cryptographic keys;
generate a third cryptographic key; and
replace the second cryptographic key in the set of cryptographic keys with the third cryptographic key.

10. The system of claim 9, wherein the instructions that cause the system to deprovision the second cryptographic key further include instructions that, as a result of execution by the one or more processors, cause the system to:
decrypt a data object encrypted with the second cryptographic key;
encrypt the data object with the third cryptographic key;
record information indicating that the data object is encrypted with the third cryptographic key; and
delete the second cryptographic key.

11. The system of claim 9, wherein the instructions that cause the system to deprovision the second cryptographic key further include instructions that, as a result of execution by the one or more processors, cause the system to remove the second cryptographic key from the set of cryptographic keys.

12. The system of claim 8, wherein the set of cryptographic keys includes a plurality of subsets of cryptographic keys corresponding to fault zones associated with different geographic regions.

13. The system of claim 8, wherein the instructions further include instructions that, as a result of execution by the one or more processors, cause the system to determine a logical key throttle rate based at least in part on a throttle rate associated with cryptographic keys of the set of cryptographic keys.

14. The system of claim 13, wherein the instructions further include instructions that, as a result of execution by the one or more processors, cause the system to add additional cryptographic keys to the set of cryptographic keys until the logical key throttle rate exceeds a quota assigned to the logical key.

15. A non-transitory computer-readable storage medium having executable instructions stored thereon that, as a result of being executed by one or more processors of a computer system, cause the computer system to at least:
receive a request to perform a cryptographic operation, the request includes a key identifier;
obtain a cryptographic key of a plurality of cryptographic keys associated with the key identifier;
use the cryptographic key of the plurality of cryptographic keys to perform the cryptographic operation; and
return a result of the cryptographic operation and the key identifier in response to the request.

16. The non-transitory computer-readable storage medium of claim 15, wherein the cryptographic key is associated with a limit on an amount of data encrypted with the cryptographic key.

17. The non-transitory computer-readable storage medium of claim 16, wherein the instructions further include instructions that, as a result of being executed by one or more processors, cause the computer system to increase a quantity of cryptographic keys in the plurality of cryptographic keys based at least in part on the cryptographic key reaching the limit on the amount of data encrypted.

18. The non-transitory computer-readable storage medium of claim 17, wherein the instructions further include instructions that, as a result of being executed by one or more processors, cause the computer system to deprovision the cryptographic key in response to the cryptographic key reaching the limit on the amount of data encrypted.

19. The non-transitory computer-readable storage medium of claim 15, wherein the instructions further include instructions that, as a result of being executed by one or more processors, cause the computer system to:
determine a throttle limit associated with the cryptographic key has been reached, wherein the cryptographic key is a first cryptographic key; and
in response, add a second cryptographic key to the plurality of cryptographic keys.

20. The non-transitory computer-readable storage medium of claim 15, wherein the instructions further include instructions that, as a result of being executed by one or more processors, cause the computer system to:
obtain, from a user associated with the key identifier, an aggregate key usage rate to associate with the key identifier; and
increase a quantity of cryptographic keys in the plurality of cryptographic keys to satisfy the aggregate key usage rate.

* * * * *